(12) United States Patent
Dikov et al.

(10) Patent No.: US 12,394,172 B1
(45) Date of Patent: Aug. 19, 2025

(54) NETWORK PARAMETER ROTATION FOR ORIENTED CAMERA IMAGES

(71) Applicant: QUALCOMM Incorporated, San Diego, CA (US)

(72) Inventors: Georgi Dikov, Amsterdam (NL); Ching-Wei Tseng, Hsinchu (TW); Nikhil Khullar, San Diego, CA (US); Mohsen Ghafoorian, Diemen (NL); Chia-Yu Tung, Hsinchu (TW)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/678,962

(22) Filed: May 30, 2024

(51) Int. Cl.
*G06V 10/24* (2022.01)
*G06T 3/60* (2024.01)
*G06V 10/82* (2022.01)

(52) U.S. Cl.
CPC .............. *G06V 10/242* (2022.01); *G06T 3/60* (2013.01); *G06V 10/82* (2022.01)

(58) Field of Classification Search
CPC ...... G06V 10/82; G06V 10/242; G06V 20/20; G06N 20/00; G06N 5/04; G06N 3/02; G06T 3/60
See application file for complete search history.

(56) References Cited

U.S. PATENT DOCUMENTS

| | | | |
|---|---|---|---|
| 2020/0110986 A1* | 4/2020 | Michiels | G06N 3/045 |
| 2021/0192182 A1* | 6/2021 | Huang | G06F 18/2413 |
| 2022/0156885 A1* | 5/2022 | Jiang | G01S 13/89 |
| 2024/0185047 A1* | 6/2024 | Ross | G06F 17/153 |

OTHER PUBLICATIONS

Lenovo (Title: Lenovo Product Development Solution Guide; URL: https://web.archive.org/web/20240612205947/https://techtoday.lenovo.com/sites/default/files/2024-01/Lenovo_Product_Development_Solutions_Guide.pdf; pp. 1-12; Published: May 12, 2024; [Retrieved: Jun. 6, 2025]) (Year: 2024).*

* cited by examiner

*Primary Examiner* — Peet Dhillon
(74) *Attorney, Agent, or Firm* — Polsinelli/Qualcomm

(57) ABSTRACT

Disclosed are systems and techniques for network parameter (e.g., weight) rotation for oriented camera images. For example, a computing device can obtain an image of a scene. The image is vertically aligned with the scene. The computing device can process the image using a neural network with rotated weights. The neural network is trained using a plurality of training images to generate a plurality of weights. The plurality of training images are horizontally aligned with a reference scene. The plurality of weights are rotated to generate the rotated weights.

20 Claims, 15 Drawing Sheets

1300

Obtain An Image Of A Scene, Wherein The Image Is Vertically Aligned With The Scene
1310

Process The Image Using A Neural Network With Rotated Weights, The Neural Network Being Trained Using A Plurality Of Training Images To Generate A Plurality Of Weights, Wherein The Plurality Of Training Images Are Horizontally Aligned With A Reference Scene, And Wherein The Plurality Of Weights Are Rotated To Generate The Rotated Weights
1320

NETWORK PARAMETER ROTATION FOR ORIENTED CAMERA IMAGES

FIELD

The present disclosure generally relates to image processing. For example, aspects of the present disclosure relate to network parameter (e.g., weight) rotation for oriented camera images.

BACKGROUND

An extended reality (XR) (e.g., virtual reality, augmented reality, mixed reality) system can provide a user with a virtual experience by immersing the user in a completely virtual environment (made up of virtual content) and/or can provide the user with an augmented or mixed reality experience by combining a real-world or physical environment with a virtual environment. One example use case for XR content that provides virtual, augmented, or mixed reality to users is to present a user with a "metaverse" experience. The metaverse is essentially a virtual universe that includes one or more three-dimensional (3D) virtual worlds. For example, a metaverse virtual environment may allow a user to virtually interact with other users (e.g., in a social setting, in a virtual meeting, etc.), to virtually shop for goods, services, property, or other item, to play computer games, and/or to experience other services.

XR systems typically perform feature analysis (e.g., extraction, semantic segmentation, object tracking, etc.) and other complex functions to display an output based on those functions to their users. In some cases, XR devices may have cameras that are mounted in a tilted orientation with respect to a normal, horizon-aligned orientation of a scene (e.g., a room). In these cases, sometimes the feature analysis can result in an inaccurate output.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems and techniques for network parameter (e.g., weight) rotation for oriented camera images. In some aspects, an apparatus for image processing is provided. The apparatus includes at least one memory and at least one processor coupled to the at least one memory and configured to: obtain an image of a scene, wherein the image is vertically aligned with the scene; and process the image using a neural network with rotated weights, the neural network being trained using a plurality of training images to generate a plurality of weights, wherein the plurality of training images are horizontally aligned with a reference scene, and wherein the plurality of weights are rotated to generate the rotated weights.

In some aspects, a method of image processing at a device is provided. The method includes: obtaining an image of a scene, wherein the image is vertically aligned with the scene; and processing the image using a neural network with rotated weights, the neural network being trained using a plurality of training images to generate a plurality of weights, wherein the plurality of training images are horizontally aligned with a reference scene, and wherein the plurality of weights are rotated to generate the rotated weights.

In some aspects, a non-transitory computer-readable medium is provided having stored thereon instructions that, when executed by at least one processor, cause the at least one processor to: obtain an image of a scene, wherein the image is vertically aligned with the scene; and process the image using a neural network with rotated weights, the neural network being trained using a plurality of training images to generate a plurality of weights, wherein the plurality of training images are horizontally aligned with a reference scene, and wherein the plurality of weights are rotated to generate the rotated weights.

In some aspects, an apparatus for image processing is provided. The apparatus includes: means for obtaining an image of a scene, wherein the image is vertically aligned with the scene; and means for processing the image using a neural network with rotated weights, the neural network being trained using a plurality of training images to generate a plurality of weights, wherein the plurality of training images are horizontally aligned with a reference scene, and wherein the plurality of weights are rotated to generate the rotated weights.

In some aspects, each of the apparatuses described above is, can be part of, or can include a mobile device, a smart or connected device, a camera system, and/or an extended reality (XR) device (e.g., a virtual reality (VR) device, an augmented reality (AR) device, or a mixed reality (MR) device). In some examples, the apparatuses can include or be part of a vehicle, a mobile device (e.g., a mobile telephone or so-called "smart phone" or other mobile device), a wearable device, a personal computer, a laptop computer, a tablet computer, a server computer, a robotics device or system, an aviation system, or other device. In some aspects, the apparatus includes an image sensor (e.g., a camera) or multiple image sensors (e.g., multiple cameras) for capturing one or more images. In some aspects, the apparatus includes one or more displays for displaying one or more images, notifications, and/or other displayable data. In some aspects, the apparatus includes one or more speakers, one or more light-emitting devices, and/or one or more microphones. In some aspects, the apparatuses described above can include one or more sensors. In some cases, the one or more sensors can be used for determining a location of the apparatuses, a state of the apparatuses (e.g., a tracking state, an operating state, a temperature, a humidity level, and/or other state), and/or for other purposes.

Some aspects include a device having a processor configured to perform one or more operations of any of the methods summarized above. Further aspects include processing devices for use in a device configured with processor-executable instructions to perform operations of any of the methods summarized above. Further aspects include a non-transitory processor-readable storage medium having stored thereon processor-executable instructions configured to cause a processor of a device to perform operations of any of the methods summarized above. Further aspects include a device having means for performing functions of any of the methods summarized above.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims. The foregoing, together with other features and aspects, will become more apparent upon referring to the following specification, claims, and accompanying drawings.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The preceding, together with other features and embodiments, will become more apparent upon referring to the following specification, claims, and accompanying drawings.

BRIEF DESCRIPTION OF THE DRAWINGS

Illustrative aspects of the present application are described in detail below with reference to the following figures.

DETAILED DESCRIPTION

Figure 1:
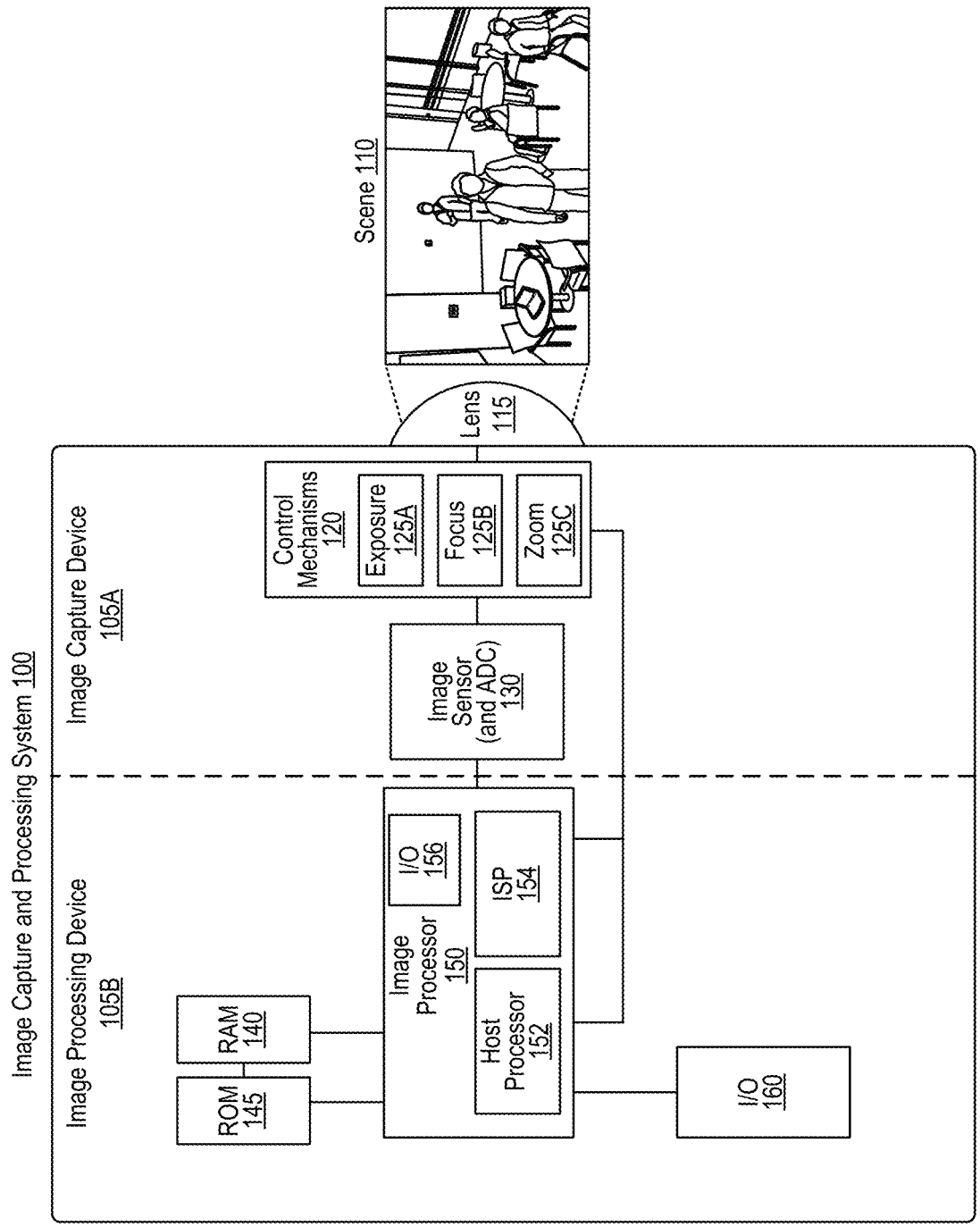
FIG. 1 is a block diagram illustrating an architecture of an image capture and processing system, in accordance with aspects of the present disclosure.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein can be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

A camera (e.g., image capture device) is a device that receives light and captures image frames, such as still images or video frames, using an image sensor. The terms "image," "image frame," and "frame" are used interchangeably herein. Cameras can be configured with a variety of image capture and image processing settings. The different settings result in images with different appearances. Some camera settings are determined and applied before or during capture of one or more image frames, such as ISO, exposure time, aperture size, f/stop, shutter speed, focus, and gain. For example, settings or parameters can be applied to an image sensor for capturing the one or more image frames. Other camera settings can configure post-processing of one or more image frames, such as alterations to contrast, brightness, saturation, sharpness, levels, curves, or colors. For example, settings or parameters can be applied to a processor (e.g., an image signal processor or ISP) for processing the one or more image frames captured by the image sensor.

Degrees of freedom (DoF) refer to the number of basic ways a rigid object can move through three-dimensional (3D) space. In some cases, six different DoF can be tracked. The six degrees of freedom include three translational degrees of freedom corresponding to translational movement along three perpendicular axes. The three axes can be referred to as x, y, and z axes. The six degrees of freedom include three rotational degrees of freedom corresponding to rotational movement around the three axes, which can be referred to as pitch, yaw, and roll.

Extended reality (XR) systems or devices can provide virtual content to a user and/or can combine real-world or physical environments and virtual environments (made up of virtual content) to provide users with XR experiences. The real-world environment can include real-world objects (also referred to as physical objects), such as people, vehicles, buildings, tables, chairs, and/or other real-world or physical objects. XR systems or devices can facilitate interaction with different types of XR environments (e.g., a user can use an XR system or device to interact with an XR environment). XR systems can include virtual reality (VR) systems facilitating interactions with VR environments, augmented reality (AR) systems facilitating interactions with AR environments, mixed reality (MR) systems facilitating interactions with MR environments, and/or other XR systems. Examples of XR systems or devices include head-mounted displays (HMDs), smart glasses, among others. In some cases, an XR system can track parts of the user (e.g., a hand and/or fingertips of a user) to allow the user to interact with items of virtual content.

AR is a technology that provides virtual or computer-generated content (referred to as AR content) over the user's view of a physical, real-world scene or environment. AR content can include virtual content, such as video, images, graphic content, location data (e.g., global positioning system (GPS) data or other location data), sounds, any combination thereof, and/or other augmented content. An AR system or device is designed to enhance (or augment), rather than to replace, a person's current perception of reality. For example, a user can see a real stationary or moving physical object through an AR device display, but the user's visual perception of the physical object may be augmented or enhanced by a virtual image of that object (e.g., a real-world car replaced by a virtual image of a DeLorean), by AR content added to the physical object (e.g., virtual wings added to a live animal), by AR content displayed relative to the physical object (e.g., informational virtual content displayed near a sign on a building, a virtual coffee cup virtually anchored to (e.g., placed on top of) a real-world table in one or more images, etc.), and/or by displaying other types of AR content. Various types of AR systems can be used for gaming, entertainment, and/or other applications.

In some cases, an XR system can include an optical "see-through" or "pass-through" display (e.g., see-through or pass-through AR HMD or AR glasses), allowing the XR system to display XR content (e.g., AR content) directly onto a real-world view without displaying video content. For example, a user may view physical objects through a display (e.g., glasses or lenses), and the AR system can display AR content onto the display to provide the user with an enhanced visual perception of one or more real-world objects. In one example, a display of an optical see-through AR system can include a lens or glass in front of each eye (or a single lens or glass over both eyes). The see-through display can allow the user to see a real-world or physical object directly, and can display (e.g., projected or otherwise displayed) an enhanced image of that object or additional AR content to augment the user's visual perception of the real world.

Visual simultaneous localization and mapping (VSLAM) is a computational geometry technique used in devices with cameras, such as robots, head-mounted displays (HMDs), mobile handsets, and autonomous vehicles. In VSLAM, a device can construct and update a map of an unknown environment based on images captured by the device's camera. The device can keep track of the device's pose within the environment (e.g., location and/or orientation) as the device updates the map. For example, the device can be activated in a particular room of a building and can move throughout the interior of the building, capturing images. The device can map the environment, and keep track of its location in the environment, based on tracking where different objects in the environment appear in different images.

In the context of systems that track movement through an environment, such as XR systems and/or VSLAM systems, degrees of freedom can refer to which of the six degrees of freedom the system is capable of tracking. 3DoF systems generally track the three rotational DoF-pitch, yaw, and roll. A 3DoF headset, for instance, can track the user of the headset turning their head left or right, tilting their head up or down, and/or tilting their head to the left or right. 6DoF systems can track the three translational DoF as well as the three rotational DoF. Thus, a 6DoF headset, for instance, and can track the user moving forward, backward, laterally, and/or vertically in addition to tracking the three rotational DoF.

In some cases, an XR system may include an HMD display, such as AR HMD or AR glasses, that may be worn by a user of the XR system. Generally, it is desirable to keep an HMD display as light and small as possible. To help reduce the weight and the size of an HMD display, the HMD display may be a relatively lower power system (e.g., in terms of battery and computational power) as compared to a device (e.g., a companion device, such as a mobile phone, a server device, or other device) with which the HMD display is connected (e.g., via a wired or wireless connected).

As previously mentioned, XR systems typically perform feature analysis (e.g., extraction, semantic segmentation, object tracking, etc.) and other complex functions to display an output based on those functions to their users. In some cases, XR devices may have cameras that are mounted in a tilted orientation with respect to a normal, horizon-aligned orientation of a scene (e.g., a room). In these cases, sometimes the feature analysis can result in an inaccurate output.

For example, XR devices may perform semantic segmentation by generating semantic labels for objects in captured images. Semantic segmentation is a computer vision task that assigns a class label to pixels within an image by using a machine learning algorithm (e.g., using a neural network). Semantic segmentation tasks help machines to distinguish between different object classes and background regions within an image. Semantic segmentation of images (along with the creation of semantic maps) plays in important role in training computers to recognize important context in digital images, such as landscapes, people, medical images, and more.

Much of the training data for networks (e.g., neural networks) for performing semantic segmentation, but not limited to this use case (e.g., object detection use cases may be applicable as well), consists of images that are in a natural, horizon-aligned orientation (e.g., in indoor environments, where a ceiling would typically be located at the top of the image, and a floor would be located at the bottom of the image). On the other hand, many XR devices have tracking cameras that are mounted in a tilted orientation (e.g., not aligned with the natural, horizon-aligned orientation) for various reasons, such as maximizing scene coverage and/or overlap.

When producing a network (e.g., a neural network) trained on images that are in a natural, horizon-aligned orientation (e.g., a first type of images), and deploying that network onto to a device (e.g., an XR device) for inference with images that are not aligned with the natural, horizon-aligned orientation (e.g., a second type of images), the results (e.g., output) can be subpar. For these cases, in order to produce an accurate output, either massive amounts of new data is needed in the corresponding orientation (e.g., images that are not aligned with the natural, horizon-aligned orientation), or the images (e.g. images that are in the natural, horizon-aligned orientation) need to be preprocessed at inference time by applying a rotation operation (e.g., rotating the images that are in the natural, horizon-aligned orientation to match the tilted orientation of the cameras).

As such, improved systems and techniques for processing images obtained by cameras mounted in a tilted orientation with respect to a normal, horizon-aligned orientation can be beneficial.

In one or more aspects, systems, apparatuses, processes (also referred to as methods), and computer-readable media (collectively referred to herein as "systems and techniques") are described herein for providing network parameter (e.g., weight) rotation for oriented camera images. In one or more examples, the systems and techniques provide for improved image processing of images obtained by cameras mounted in a tilted orientation with respect to a normal, horizon-aligned orientation.

In one or more examples, for the systems and techniques, when cameras are mounted on a device (e.g., an XR device) such that the cameras have a tilting angle that is a multiple of ninety (90) degrees (or approximately close to 90 degrees, such as between eighty (80) to one hundred (100) degrees) with respect to a natural, horizon-aligned orientation, after training a network (e.g., a neural network) on images that are in the natural, horizon-aligned orientation, the resultant network weights of the network can be rotated to produce rotated weights. The network with the rotated weights can then be deployed onto the device to produce an accurate output, without the need of costly image preprocessing.

Fully convolutional networks, such as those that are typically used for semantic segmentation, have kernels of rectangular shape that are amenable to a 90 degree rotation (or a multiple thereof), such that if the image is tilted by a multiple of 90 degrees with respect to the natural, horizon-aligned orientation, there would be no degradation in accuracy. This kernel rotation can be done once after the training of the network, and is computationally low cost.

When the network with the rotated weights is deployed onto a device (e.g., an XR device) that captures tilted images (e.g., images that are not aligned with the natural, horizon-aligned orientation), a significant amount of energy can be saved by not performing a preprocessing task of rotating the tilted images to the training data orientation (e.g., the natural, horizon-aligned orientation). The systems and techniques allow for a network (e.g., a neural network) to be trained on an abundant amount of images that are aligned with a natural, horizon-aligned orientation, and then to deploy the network with rotated weights onto devices with cameras mounted with an approximately 90, 180, or 270 degrees tilt angle with respect to the natural, horizon-aligned orientation. The rotation can be in a clockwise and/or a counterclockwise direction.

In one or more aspects, as previously mentioned, some XR devices (e.g., VR/AR devices) have cameras with natural, horizon-aligned camera orientations. However, most XR devices have tilted cameras, which may make a network (e.g., a neural network, such as a convolutional neural network ((CNN), during performance of semantic segmentation, misclassify regions with learnt spatial priors where, for example, a ceiling is located at the top of an image and a floor is located at the bottom of the image. In order to avoid a preprocessing time of rotating the input image or a training on rotated image datasets, the weights of the network can be rotated (e.g., in a clockwise and/or a counterclockwise direction) rather than rotating the images.

In one or more aspects, during operation of the systems and techniques for image processing at a device, an image of a scene can be obtained, wherein the image is vertically aligned with the scene. The image can then be processed using a neural network with rotated weights. In one or more examples, the neural network can be trained using a plurality of training images to generate a plurality of weights. In some examples, the plurality of training images are horizontally aligned with a reference scene. In one or more examples, the plurality of weights are rotated to generate the rotated weights.

In some examples, an image sensor can be used capture the image of the scene. In one or more examples, the image sensor is vertically aligned with a horizontal axis of the device. The term vertically aligned refers to perpendicular alignment (aligned 90 degrees) relative to the horizontal axis or approximately perpendicular alignment (e.g., between 80 and 100 degrees) relative to the horizontal axis. In some examples, the image sensor can be a tracking camera for six degrees of freedom (6 DoF) pose estimation. In some cases, additionally or alternatively to using an image sensor, images from other types of sensors can be used, such as depth images (or depth maps) from one or more depth sensors. In some aspects, a combination of different types of images can be used, such as a combination of images from an image sensor (e.g., red-green-blue (RGB) images or monochrome images combined with depth images or depth maps). In one or more examples, the plurality of training images that are horizontally aligned with the reference scene are rotated ninety (90) degrees relative to the image that is vertically aligned with the scene. In some cases, the plurality of training images that are horizontally aligned with the reference scene are aligned with a horizon of the reference scene and the scene. In one or more examples, the neural network can be a convolutional neural network, a fully connected neural network, or a vision transformer. In some examples, based on processing the image using the neural network, a semantic segmentation map and/or an object detection output can be outputted.

In one or more examples, the plurality of weights are included in at least one convolutional kernel. In some examples, the plurality of weights are rotated based on rotating the at least one convolutional kernel. In one or more examples, the at least one convolutional kernel is rotated by ninety degrees (e.g., in a clockwise and/or counterclockwise direction) or close to ninety degrees (e.g., between eighty and one hundred degrees). In some examples, the plurality of weights are included in one or more convolutional layers. In one or more examples, vertical and horizontal components of a stride and/or a padding of the one or more convolutional layers are swapped to generate the rotated weights. In some examples, the neural network includes a fully connected layer, and wherein weights of the fully connected layer are not rotated.

In some examples, the device is a head-mounted device (HMD). In one or more examples, the HMD can receive, from another device, the neural network with the rotated weights.

In one or more aspects, the systems and techniques have a number of advantages. In one or more examples, rotating the weights of the network (e.g., before deployment of the network onto the device), rather than rotating the input images, significantly reduces inference computational costs. For example, a rotation by 90 degrees of a 480×640 pixel image on a device (e.g., a Kona device) can take as long as eight (8) milliseconds (ms). If a rotation is performed for every image frame, even when using a keyframe selection mechanism that averages approximately five (5) frames per second (fps), during ten (10) minutes of device usage, twenty-four (24) seconds of image rotation time can be saved by employing the disclosed systems and techniques.

In one or more examples, performing training and inference in a natural, horizon-aligned orientation rather than a tilted orientation is more effective and accurate. For example, performing training and inference in a natural, horizon-aligned orientation rather than a tilted orientation can be better aligned with strong priors learned from pre-training on large datasets, such as commercially available datasets (e.g., ImageNet, ADE-20K, ScanNet, etc.), which are in the natural, horizon-aligned orientation. Realistically, the scale of internal datasets obtained from tilted cameras are not comparable to the commercially available datasets.

In one or more examples, the systems and techniques enable unification of the typical device-specific models (e.g., network models). For example, for the systems and techniques, only one model (e.g., one network model) needs to be trained, and then the resultant weights can be rotated for different device models (e.g., network models for devices with tilted cameras), rather than needing to train one model per device.

In one or more examples, the systems and techniques simplify the device code logic and improve maintainability. For example, the device code logic is simplified due to the lack of code used to do the image rotation to and from the natural, horizon-aligned orientation.

Additional aspects of the present disclosure are described in more detail below.

FIG. 1 is a block diagram illustrating an architecture of an image capture and processing system 100. The image capture and processing system 100 includes various components that are used to capture and process images of scenes (e.g., an image of a scene 110). The image capture and processing system 100 can capture standalone images (or photographs) and/or can capture videos that include multiple images (or video frames) in a particular sequence. In some cases, the lens 115 and image sensor 130 can be associated with an optical axis. In one illustrative example, the photosensitive area of the image sensor 130 (e.g., the photodiodes) and the lens 115 can both be centered on the optical axis. A lens 115 of the image capture and processing system 100 faces a scene 110 and receives light from the scene 110. The lens 115 bends incoming light from the scene toward the image sensor 130. The light received by the lens 115 passes through an aperture. In some cases, the aperture (e.g., the aperture size) is controlled by one or more control mechanisms 120 and is received by an image sensor 130. In some cases, the aperture can have a fixed size.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo (or other lens mechanism), thereby adjusting focus. In some cases, additional lenses may be included in the image capture and processing system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), hybrid autofocus (HAF), or some combination thereof. The focus setting may be determined using the control mechanism 120, the image sensor 130, and/or the image processor 150. The focus setting may be referred to as an image capture setting and/or an image processing setting. In some cases, the lens 115 can be fixed relative to the image sensor and focus control mechanism 125B can be omitted without departing from the scope of the present disclosure.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a duration of time for which the sensor collects light (e.g., exposure time or electronic shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos (or other lens mechanism) to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference of one another) with a negative (e.g., diverging, concave) lens between them. In some cases, the zoom control mechanism 125C moves one or more of the lenses in the afocal zoom system, such as the negative lens and one or both of the positive lenses. In some cases, zoom control mechanism 125C can control the zoom by capturing an image from an image sensor of a plurality of image sensors (e.g., including image sensor 130) with a zoom corresponding to the zoom setting. For example, image processing system 100 can include a wide angle image sensor with a relatively low zoom and a telephoto image sensor with a greater zoom. In some cases, based on the selected zoom setting, the zoom control mechanism 125C can capture images from a corresponding sensor.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different filters. In some cases, different photodiodes can be covered in color filters, and may thus measure light matching the color of the filter covering the photodiode. Various color filter arrays can be used, including a Bayer color filter array, a quad color filter array (also referred to as a quad Bayer color filter array or QCFA), and/or any other color filter array. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter.

Returning to FIG. 1, other types of color filters may use yellow, magenta, and/or cyan (also referred to as "emerald") color filters instead of or in addition to red, blue, and/or green color filters. In some cases, some photodiodes may be configured to measure infrared (IR) light. In some implementations, photodiodes measuring IR light may not be covered by any filter, thus allowing IR photodiodes to measure both visible (e.g., color) and IR light. In some examples, IR photodiodes may be covered by an IR filter, allowing IR light to pass through and blocking light from other parts of the frequency spectrum (e.g., visible light, color). Some image sensors (e.g., image sensor 130) may lack filters (e.g., color, IR, or any other part of the light spectrum) altogether and may instead use different photodiodes throughout the pixel array (in some cases vertically stacked). The different photodiodes throughout the pixel array can have different spectral sensitivity curves, therefore responding to different wavelengths of light. Monochrome image sensors may also lack filters and therefore lack color depth.

In some cases, the image sensor 130 may alternately or additionally include opaque and/or reflective masks that block light from reaching certain photodiodes, or portions of certain photodiodes, at certain times and/or from certain angles. In some cases, opaque and/or reflective masks may be used for phase detection autofocus (PDAF). In some cases, the opaque and/or reflective masks may be used to block portions of the electromagnetic spectrum from reaching the photodiodes of the image sensor (e.g., an IR cut filter, a UV cut filter, a band-pass filter, low-pass filter, high-pass filter, or the like). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

Figure 14:
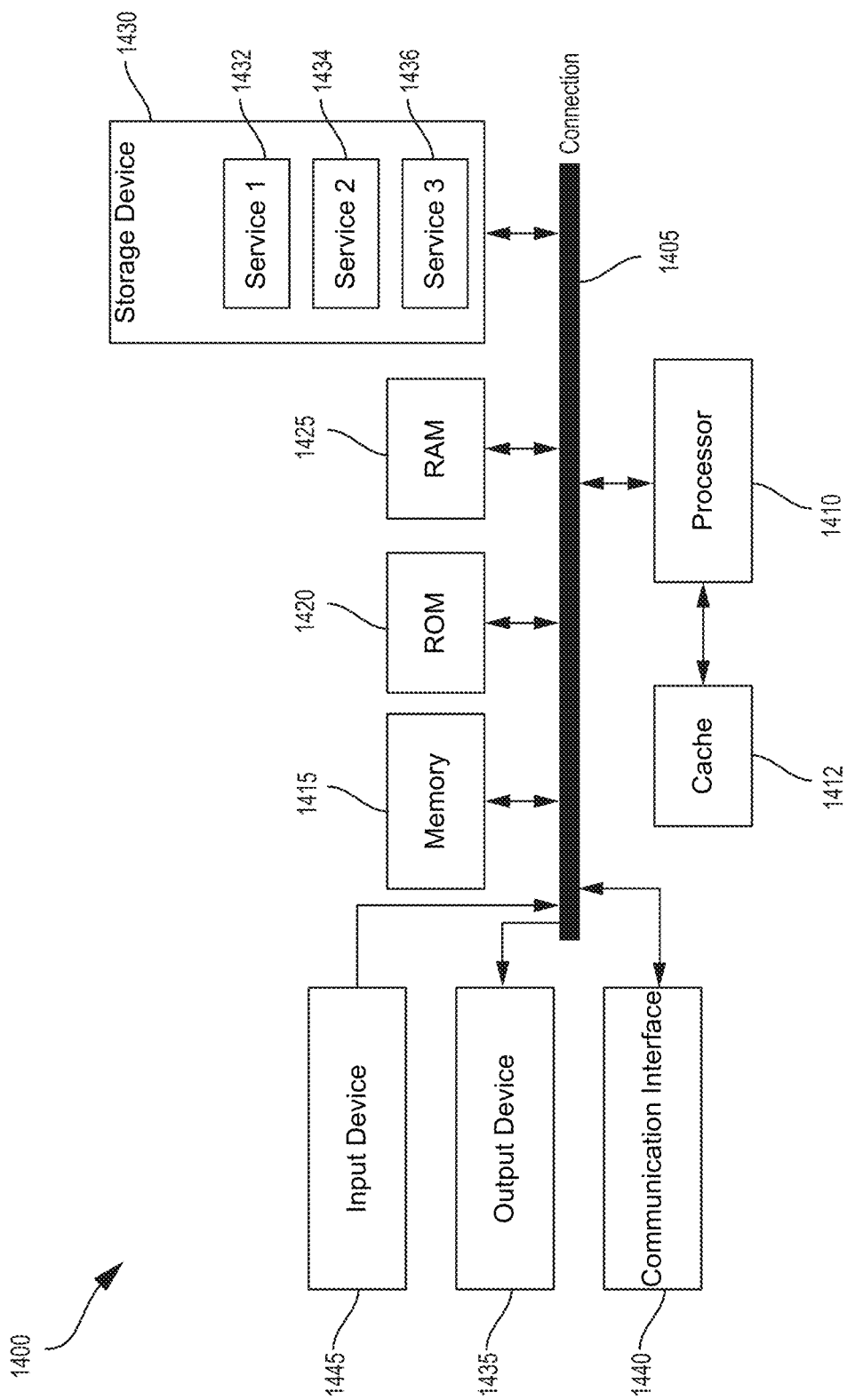
FIG. 14 is a diagram illustrating an example of a system for implementing certain aspects described herein.

The image processor 150 may include one or more processors, such as one or more image signal processors (ISPs) (including ISP 154), one or more host processors (including host processor 152), and/or one or more of any other type of processor 1410 discussed with respect to the computing system 1400 of FIG. 14. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140/1025, read-only memory (ROM) 145/1020, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices 1035, any other input devices 1045, or some combination thereof. In some cases, a caption may be input into the image processing device 105B through a physical keyboard or keypad of the I/O devices 160, or through a virtual keyboard or keypad of a touchscreen of the I/O devices 160. The I/O devices 160 may include one or more ports, jacks, or other connectors that enable a wired connection between the image capture and processing system 100 and one or more peripheral devices, over which the image capture and processing system 100 may receive data from the one or more peripheral device and/or transmit data to the one or more peripheral devices. The I/O devices 160 may include one or more wireless transceivers that enable a wireless connection between the image capture and processing system 100 and one or more peripheral devices, over which the image capture and processing system 100 may receive data from the one or more peripheral device and/or transmit data to the one or more peripheral devices. The peripheral devices may include any of the previously discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O devices 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 802.11 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

Figure 2:
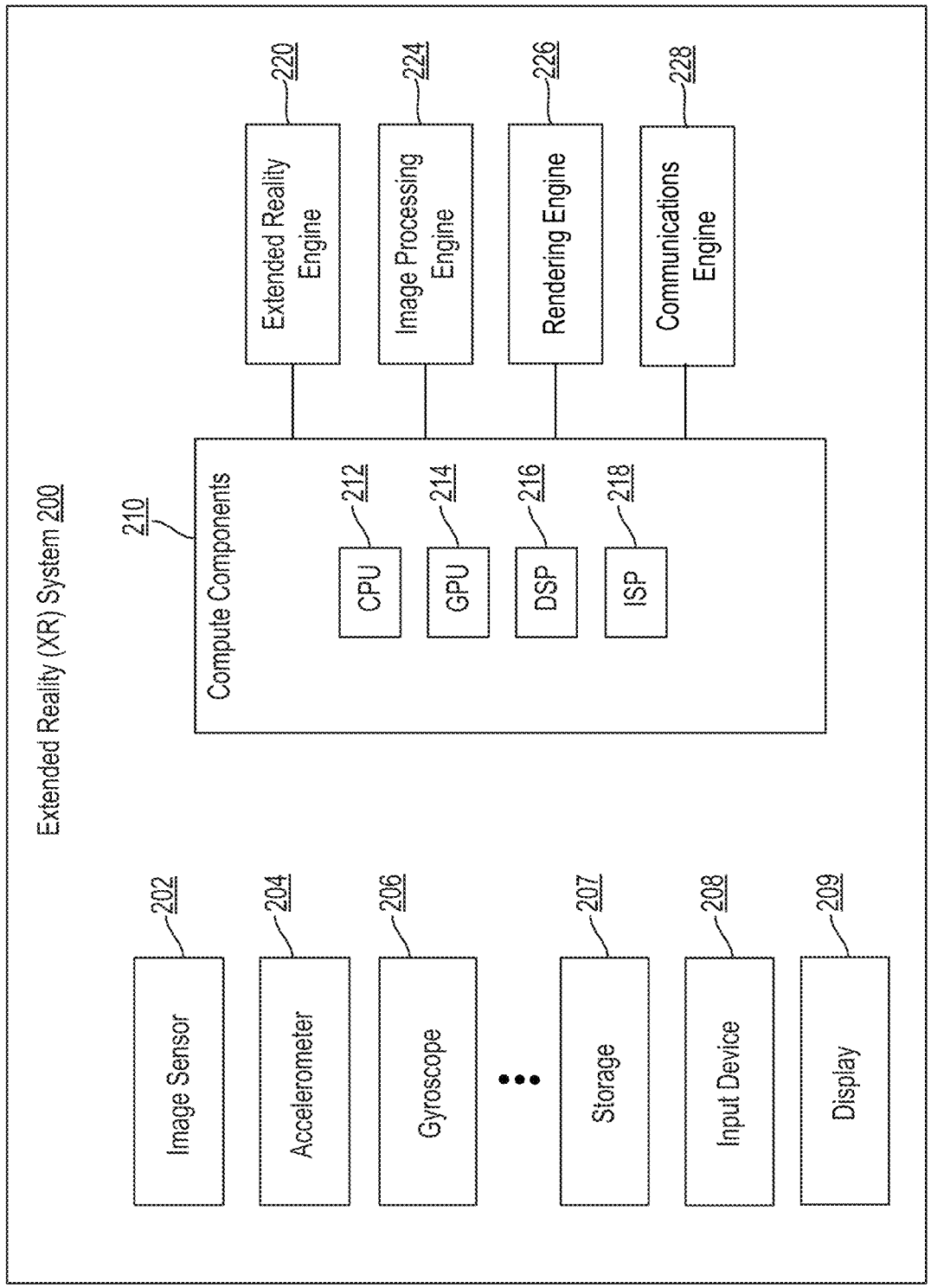
FIG. 2 is a diagram illustrating an architecture of an example extended reality (XR) system, in accordance with some aspects of the disclosure.

In some examples, the extended reality (XR) system 200 of FIG. 2 can include the image capture and processing system 100, the image capture device 105A, the image processing device 105B, or a combination thereof. In some examples, a simultaneous localization and mapping (SLAM) system can include the image capture and processing system 100, the image capture device 105A, the image processing device 105B, or a combination thereof.

FIG. 2 is a diagram illustrating an architecture of an example extended reality (XR) system 200, in accordance with some aspects of the disclosure. The XR system 200 can run (or execute) XR applications and implement XR operations. In some examples, the XR system 200 can perform tracking and localization, mapping of an environment in the physical world (e.g., a scene), and/or positioning and rendering of virtual content on a display 209 (e.g., a screen, visible plane/region, and/or other display) as part of an XR experience. For example, the XR system 200 can generate a map (e.g., a three-dimensional (3D) map) of an environment in the physical world, track a pose (e.g., location and position) of the XR system 200 relative to the environment (e.g., relative to the 3D map of the environment), position and/or anchor virtual content in a specific location(s) on the map of the environment, and render the virtual content on the display 209 such that the virtual content appears to be at a location in the environment corresponding to the specific location on the map of the scene where the virtual content is positioned and/or anchored. The display 209 can include a glass, a screen, a lens, a projector, and/or other display mechanism that allows a user to see the real-world environment and also allows XR content to be overlaid, overlapped, blended with, or otherwise displayed thereon.

In this illustrative example, the XR system 200 includes one or more image sensors 202, an accelerometer 204, a gyroscope 206, storage 207, compute components 210, an XR engine 220, an image processing engine 224, a rendering engine 226, and a communications engine 228. It should be noted that the components 202-228 shown in FIG. 2 are non-limiting examples provided for illustrative and explanation purposes, and other examples can include more, fewer, or different components than those shown in FIG. 2. For example, in some cases, the XR system 200 can include one or more other sensors (e.g., one or more inertial measurement units (IMUs), radars, light detection and ranging (LIDAR) sensors, radio detection and ranging (RADAR)

sensors, sound detection and ranging (SODAR) sensors, sound navigation and ranging (SONAR) sensors, audio sensors, etc.), one or more display devices, one more other processing engines, one or more other hardware components, and/or one or more other software and/or hardware components that are not shown in FIG. 2. While various components of the XR system 200, such as the image sensor 202, may be referenced in the singular form herein, it should be understood that the XR system 200 may include multiple of any component discussed herein (e.g., multiple image sensors 202).

The XR system 200 includes or is in communication with (wired or wirelessly) an input device 208. The input device 208 can include any suitable input device, such as a touchscreen, a pen or other pointer device, a keyboard, a mouse a button or key, a microphone for receiving voice commands, a gesture input device for receiving gesture commands, a video game controller, a steering wheel, a joystick, a set of buttons, a trackball, a remote control, any other input device 1045 discussed herein, or any combination thereof. In some cases, the image sensor 202 can capture images that can be processed for interpreting gesture commands.

The XR system 200 can also communicate with one or more other electronic devices (wired or wirelessly). For example, communications engine 228 can be configured to manage connections and communicate with one or more electronic devices. In some cases, the communications engine 228 can correspond to the communications interface 1440 of FIG. 14.

In some implementations, the one or more image sensors 202, the accelerometer 204, the gyroscope 206, storage 207, compute components 210, XR engine 220, image processing engine 224, and rendering engine 226 can be part of the same computing device. For example, in some cases, the one or more image sensors 202, the accelerometer 204, the gyroscope 206, storage 207, compute components 210, XR engine 220, image processing engine 224, and rendering engine 226 can be integrated into an HMD, extended reality glasses, smartphone, laptop, tablet computer, gaming system, and/or any other computing device. However, in some implementations, the one or more image sensors 202, the accelerometer 204, the gyroscope 206, storage 207, compute components 210, XR engine 220, image processing engine 224, and rendering engine 226 can be part of two or more separate computing devices. For example, in some cases, some of the components 202-226 can be part of, or implemented by, one computing device and the remaining components can be part of, or implemented by, one or more other computing devices.

The storage 207 can be any storage device(s) for storing data. Moreover, the storage 207 can store data from any of the components of the XR system 200. For example, the storage 207 can store data from the image sensor 202 (e.g., image or video data), data from the accelerometer 204 (e.g., measurements), data from the gyroscope 206 (e.g., measurements), data from the compute components 210 (e.g., processing parameters, preferences, virtual content, rendering content, scene maps, tracking and localization data, object detection data, privacy data, XR application data, face recognition data, occlusion data, etc.), data from the XR engine 220, data from the image processing engine 224, and/or data from the rendering engine 226 (e.g., output frames). In some examples, the storage 207 can include a buffer for storing frames for processing by the compute components 210.

The one or more compute components 210 can include a central processing unit (CPU) 212, a graphics processing unit (GPU) 214, a digital signal processor (DSP) 216, an image signal processor (ISP) 218, and/or other processor (e.g., a neural processing unit (NPU) implementing one or more trained neural networks). The compute components 210 can perform various operations such as image enhancement, computer vision, graphics rendering, extended reality operations (e.g., tracking, localization, pose estimation, mapping, content anchoring, content rendering, etc.), image and/or video processing, sensor processing, recognition (e.g., text recognition, facial recognition, object recognition, feature recognition, tracking or pattern recognition, scene recognition, occlusion detection, etc.), trained machine learning operations, filtering, and/or any of the various operations described herein. In some examples, the compute components 210 can implement (e.g., control, operate, etc.) the XR engine 220, the image processing engine 224, and the rendering engine 226. In other examples, the compute components 210 can also implement one or more other processing engines.

The image sensor 202 can include any image and/or video sensors or capturing devices. In some examples, the image sensor 202 can be part of a multiple-camera assembly, such as a dual-camera assembly. The image sensor 202 can capture image and/or video content (e.g., raw image and/or video data), which can then be processed by the compute components 210, the XR engine 220, the image processing engine 224, and/or the rendering engine 226 as described herein. In some examples, the image sensors 202 may include an image capture and processing system 100, an image capture device 105A, an image processing device 105B, or a combination thereof.

In some examples, the image sensor 202 can capture image data and can generate images (also referred to as frames) based on the image data and/or can provide the image data or frames to the XR engine 220, the image processing engine 224, and/or the rendering engine 226 for processing. An image or frame can include a video frame of a video sequence or a still image. An image or frame can include a pixel array representing a scene. For example, an image can be a red-green-blue (RGB) image having red, green, and blue color components per pixel; a luma, chroma-red, chroma-blue (YCbCr) image having a luma component and two chroma (color) components (chroma-red and chroma-blue) per pixel; or any other suitable type of color or monochrome image.

In some cases, the image sensor 202 (and/or other camera of the XR system 200) can be configured to also capture depth information. For example, in some implementations, the image sensor 202 (and/or other camera) can include an RGB-depth (RGB-D) camera. In some cases, the XR system 200 can include one or more depth sensors (not shown) that are separate from the image sensor 202 (and/or other camera) and that can capture depth information. For instance, such a depth sensor can obtain depth information independently from the image sensor 202. In some examples, a depth sensor can be physically installed in the same general location as the image sensor 202, but may operate at a different frequency or frame rate from the image sensor 202. In some examples, a depth sensor can take the form of a light source that can project a structured or textured light pattern, which may include one or more narrow bands of light, onto one or more objects in a scene. Depth information can then be obtained by exploiting geometrical distortions of the projected pattern caused by the surface shape of the object. In one example, depth information may be obtained from stereo sensors such as a combination of an infra-red structured light projector and an infra-red camera registered to a camera (e.g., an RGB camera).

The XR system 200 can also include other sensors in its one or more sensors. The one or more sensors can include one or more accelerometers (e.g., accelerometer 204), one or more gyroscopes (e.g., gyroscope 206), and/or other sensors. The one or more sensors can provide velocity, orientation, and/or other position-related information to the compute components 210. For example, the accelerometer 204 can detect acceleration by the XR system 200 and can generate acceleration measurements based on the detected acceleration. In some cases, the accelerometer 204 can provide one or more translational vectors (e.g., up/down, left/right, forward/back) that can be used for determining a position or pose of the XR system 200. The gyroscope 206 can detect and measure the orientation and angular velocity of the XR system 200. For example, the gyroscope 206 can be used to measure the pitch, roll, and yaw of the XR system 200. In some cases, the gyroscope 206 can provide one or more rotational vectors (e.g., pitch, yaw, roll). In some examples, the image sensor 202 and/or the XR engine 220 can use measurements obtained by the accelerometer 204 (e.g., one or more translational vectors) and/or the gyroscope 206 (e.g., one or more rotational vectors) to calculate the pose of the XR system 200. As previously noted, in other examples, the XR system 200 can also include other sensors, such as an inertial measurement unit (IMU), a magnetometer, a gaze and/or eye tracking sensor, a machine vision sensor, a smart scene sensor, a speech recognition sensor, an impact sensor, a shock sensor, a position sensor, a tilt sensor, etc.

As noted above, in some cases, the one or more sensors can include at least one IMU. An IMU is an electronic device that measures the specific force, angular rate, and/or the orientation of the XR system 200, using a combination of one or more accelerometers, one or more gyroscopes, and/or one or more magnetometers. In some examples, the one or more sensors can output measured information associated with the capture of an image captured by the image sensor 202 (and/or other camera of the XR system 200) and/or depth information obtained using one or more depth sensors of the XR system 200.

The output of one or more sensors (e.g., the accelerometer 204, the gyroscope 206, one or more IMUs, and/or other sensors) can be used by the XR engine 220 to determine a pose of the XR system 200 (also referred to as the head pose) and/or the pose of the image sensor 202 (or other camera of the XR system 200). In some cases, the pose of the XR system 200 and the pose of the image sensor 202 (or other camera) can be the same. The pose of image sensor 202 refers to the position and orientation of the image sensor 202 relative to a frame of reference (e.g., with respect to the scene 110). In some implementations, the camera pose can be determined for 6-Degrees Of Freedom (6DoF), which refers to three translational components (e.g., which can be given by X (horizontal), Y (vertical), and Z (depth) coordinates relative to a frame of reference, such as the image plane) and three angular components (e.g., roll, pitch, and yaw relative to the same frame of reference). In some implementations, the camera pose can be determined for 3-Degrees of Freedom (3DoF), which refers to the three angular components (e.g., roll, pitch, and yaw).

In some cases, a device tracker (not shown) can use the measurements from the one or more sensors and image data from the image sensor 202 to track a pose (e.g., a 6DoF pose) of the XR system 200. For example, the device tracker can fuse visual data (e.g., using a visual tracking solution) from the image data with inertial data from the measurements to determine a position and motion of the XR system 200 relative to the physical world (e.g., the scene) and a map of the physical world. As described below, in some examples, when tracking the pose of the XR system 200, the device tracker can generate a three-dimensional (3D) map of the scene (e.g., the real world) and/or generate updates for a 3D map of the scene. The 3D map updates can include, for example and without limitation, new or updated features and/or feature or landmark points associated with the scene and/or the 3D map of the scene, localization updates identifying or updating a position of the XR system 200 within the scene and the 3D map of the scene, etc. The 3D map can provide a digital representation of a scene in the real/physical world. In some examples, the 3D map can anchor location-based objects and/or content to real-world coordinates and/or objects. The XR system 200 can use a mapped scene (e.g., a scene in the physical world represented by, and/or associated with, a 3D map) to merge the physical and virtual worlds and/or merge virtual content or objects with the physical environment.

In some aspects, the pose of image sensor 202 and/or the XR system 200 as a whole can be determined and/or tracked by the compute components 210 using a visual tracking solution based on images captured by the image sensor 202 (and/or other camera of the XR system 200). For instance, in some examples, the compute components 210 can perform tracking using computer vision-based tracking, model-based tracking, and/or simultaneous localization and mapping (SLAM) techniques. For instance, the compute components 210 can perform SLAM or can be in communication (wired or wireless) with a SLAM system (not shown). SLAM refers to a class of techniques where a map of an environment (e.g., a map of an environment being modeled by XR system 200) is created while simultaneously tracking the pose of a camera (e.g., image sensor 202) and/or the XR system 200 relative to that map. The map can be referred to as a SLAM map, and can be three-dimensional (3D). The SLAM techniques can be performed using color or grayscale image data captured by the image sensor 202 (and/or other camera of the XR system 200), and can be used to generate estimates of 6DoF pose measurements of the image sensor 202 and/or the XR system 200. Such a SLAM technique configured to perform 6DoF tracking can be referred to as 6DoF SLAM. In some cases, the output of the one or more sensors (e.g., the accelerometer 204, the gyroscope 206, one or more IMUs, and/or other sensors) can be used to estimate, correct, and/or otherwise adjust the estimated pose.

In some cases, the 6DoF SLAM (e.g., 6DoF tracking) can associate features observed from certain input images from the image sensor 202 (and/or other camera) to the SLAM map. For example, 6DoF SLAM can use feature point associations from an input image to determine the pose (position and orientation) of the image sensor 202 and/or XR system 200 for the input image. 6DoF mapping can also be performed to update the SLAM map. In some cases, the SLAM map maintained using the 6DoF SLAM can contain 3D feature points triangulated from two or more images. For example, key frames can be selected from input images or a video stream to represent an observed scene. For every key frame, a respective 6DoF camera pose associated with the image can be determined. The pose of the image sensor 202 and/or the XR system 200 can be determined by projecting features from the 3D SLAM map into an image or video frame and updating the camera pose from verified 2D-3D correspondences.

In one illustrative example, the compute components 210 can extract feature points from certain input images (e.g., every input image, a subset of the input images, etc.) or from each key frame. A feature point (also referred to as a registration point) as used herein is a distinctive or identifiable part of an image, such as a part of a hand, an edge of a table, among others. Features extracted from a captured image can represent distinct feature points along three-dimensional space (e.g., coordinates on X, Y, and Z-axes), and every feature point can have an associated feature location. The feature points in key frames either match (are the same or correspond to) or fail to match the feature points of previously-captured input images or key frames. Feature detection can be used to detect the feature points. Feature detection can include an image processing operation used to examine one or more pixels of an image to determine whether a feature exists at a particular pixel. Feature detection can be used to process an entire captured image or certain portions of an image. For each image or key frame, once features have been detected, a local image patch around the feature can be extracted. Features may be extracted using any suitable technique, such as Scale Invariant Feature Transform (SIFT) (which localizes features and generates their descriptions), Learned Invariant Feature Transform (LIFT), Speed Up Robust Features (SURF), Gradient Location-Orientation histogram (GLOH), Oriented Fast and Rotated Brief (ORB), Binary Robust Invariant Scalable Keypoints (BRISK), Fast Retina Keypoint (FREAK), KAZE, Accelerated KAZE (AKAZE), Normalized Cross Correlation (NCC), descriptor matching, another suitable technique, or a combination thereof.

As one illustrative example, the compute components 210 can extract feature points corresponding to a mobile device, or the like. In some cases, feature points corresponding to the mobile device can be tracked to determine a pose of the mobile device. As described in more detail below, the pose of the mobile device can be used to determine a location for projection of AR media content that can enhance media content displayed on a display of the mobile device.

In some cases, the XR system 200 can also track the hand and/or fingers of the user to allow the user to interact with and/or control virtual content in a virtual environment. For example, the XR system 200 can track a pose and/or movement of the hand and/or fingertips of the user to identify or translate user interactions with the virtual environment. The user interactions can include, for example and without limitation, moving an item of virtual content, resizing the item of virtual content, selecting an input interface element in a virtual user interface (e.g., a virtual representation of a mobile phone, a virtual keyboard, and/or other virtual interface), providing an input through a virtual user interface, etc.

Figure 3A:
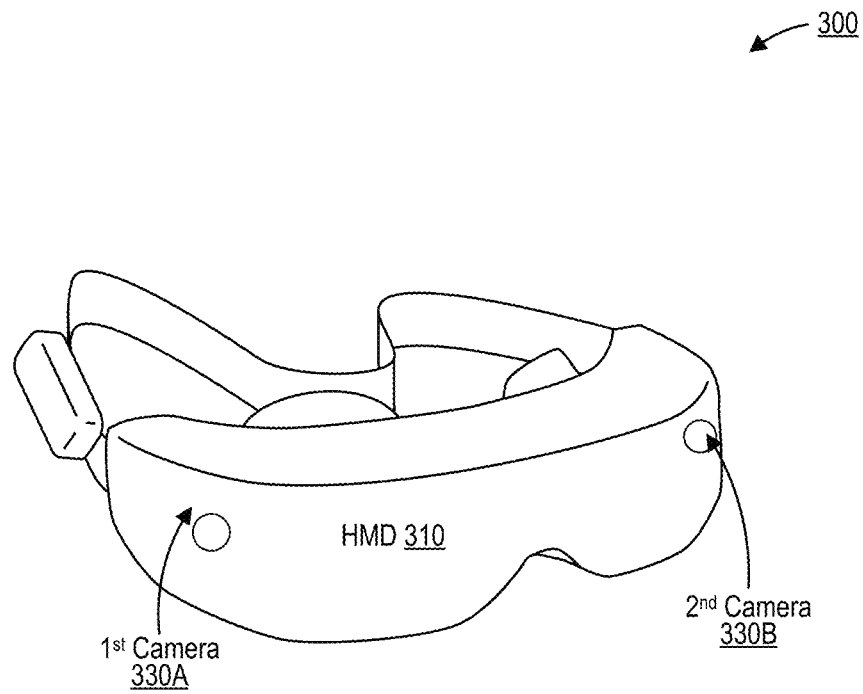
FIG. 3A is a perspective diagram illustrating a head-mounted display (HMD) that performs feature tracking and/or visual simultaneous localization and mapping (VSLAM), in accordance with some aspects of the disclosure.

FIG. 3A is a perspective diagram 300 illustrating a head-mounted display (HMD) 310 that performs processes, such as semantic segmentation and object detection. The HMD 310 may be, for example, an augmented reality (AR) headset, a virtual reality (VR) headset, a mixed reality (MR) headset, an extended reality (XR) headset, or some combination thereof. The HMD 310 may be an example of an XR system 200, a SLAM system, or a combination thereof. The HMD 310 includes a first camera 330A and a second camera 330B along a front portion of the HMD 310. In some examples, the HMD 310 may only have a single camera. In some examples, the HMD 310 may include one or more additional cameras in addition to the first camera 330A and the second camera 330B. In some examples, the HMD 310 may include one or more additional sensors in addition to the first camera 330A and the second camera 330B.

Figure 3B:
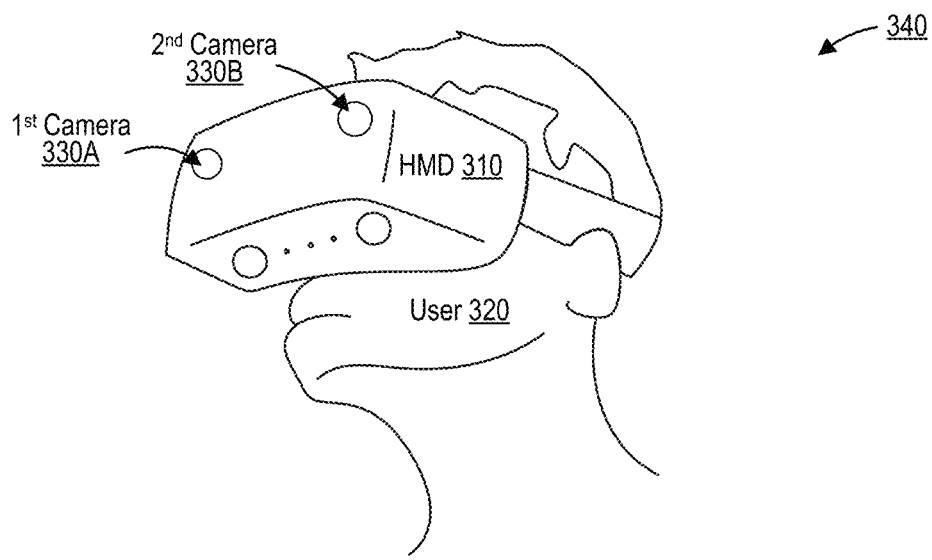
FIG. 3B is a perspective diagram illustrating the HMD of FIG. 10A being worn by a user, in accordance with some aspects of the disclosure.

FIG. 3B is a perspective diagram 340 illustrating the head-mounted display (HMD) 310 of FIG. 3A being worn by a user 320, in accordance with some examples. The user 320 wears the HMD 310 on the user 320's head over the user 320's eyes. The HMD 310 can capture images with the first camera 330A and the second camera 330B. In some examples, the HMD 310 displays one or more display images toward the user 320's eyes that are based on the images captured by the first camera 330A and the second camera 330B. The display images may provide a stereoscopic view of the environment, in some cases with information overlaid and/or with other modifications. For example, the HMD 310 can display a first display image to the user 320's right eye, the first display image based on an image captured by the first camera 330A. The HMD 310 can display a second display image to the user 320's left eye, the second display image based on an image captured by the second camera 330B. For instance, the HMD 310 may provide overlaid information in the display images overlaid over the images captured by the first camera 330A and the second camera 330B.

The HMD 310 may include no wheels, propellers or other conveyance of its own. Instead, the HMD 310 relies on the movements of the user 320 to move the HMD 310 about the environment. In some cases, for instance where the HMD 310 is a VR headset, the environment may be entirely or partially virtual. If the environment is at least partially virtual, then movement through the virtual environment may be virtual as well. For instance, movement through the virtual environment can be controlled by an input device 208. The movement actuator may include any such input device 208. Movement through the virtual environment may not require wheels, propellers, legs, or any other form of conveyance. Even if an environment is virtual, SLAM techniques may still be valuable, as the virtual environment can be unmapped and/or may have been generated by a device other than the HMD 310, such as a remote server or console associated with a video game or video game platform. In some cases, feature tracking and/or SLAM may be performed in a virtual environment even by a vehicle or other device that has its own physical conveyance system that allows it to physically move about a physical environment. For example, SLAM may be performed in a virtual environment to test whether a SLAM system is working properly without wasting time or energy on movement and without wearing out a physical conveyance system.

1 In some cases, sensor data, such as images captured by the image capture and processing system 100 of FIG. 1, point clouds captured by LIDAR/RADAR sensors, etc., may be processed by neural networks and/or machine learning (ML) systems. A neural network is an example of an ML system, and a neural network can include an input layer, one or more hidden layers, and an output layer. Data is provided from input nodes of the input layer, processing is performed by hidden nodes of the one or more hidden layers, and an output is produced through output nodes of the output layer. Deep learning networks typically include multiple hidden layers. Each layer of the neural network can include feature maps or activation maps that can include artificial neurons (or nodes). A feature map can include a filter, a kernel, or the like. The nodes can include one or more weights used to indicate an importance of the nodes of one or more of the layers. In some cases, a deep learning network can have a series of many hidden layers, with early layers being used to determine simple and low level characteristics of an input, and later layers building up a hierarchy of more complex and abstract characteristics.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input. The connections between layers of a neural network may be fully connected or locally connected. Various examples of neural network architectures are described below with respect to FIG. 4A-FIG. 4D.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 4A:
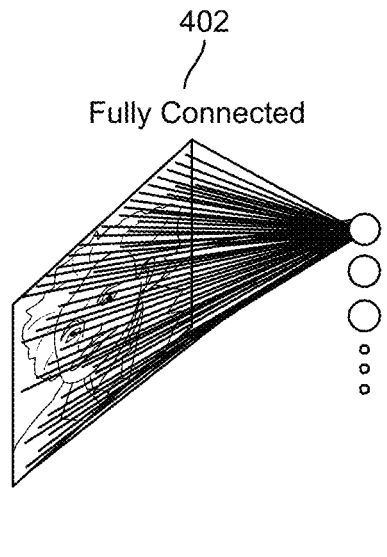
FIG. 4A is a diagram illustrating an example of a fully-connected neural network, in accordance with some examples of the present disclosure.
Figure 4B:
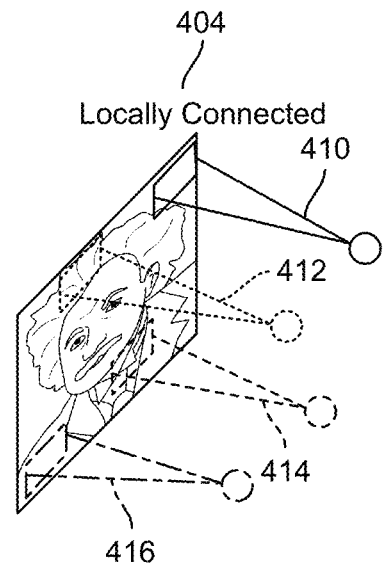
FIG. 4B is a diagram illustrating an example of a locally-connected neural network, in accordance with some examples of the present disclosure.

The connections between layers of a neural network may be fully connected or locally connected. FIG. 4A illustrates an example of a fully connected neural network 402. In a fully connected neural network 402, a neuron in a first layer may communicate its output to every neuron in a second layer, so that each neuron in the second layer will receive input from every neuron in the first layer. FIG. 4B illustrates an example of a locally connected neural network 404. In a locally connected neural network 404, a neuron in a first layer may be connected to a limited number of neurons in the second layer. More generally, a locally connected layer of the locally connected neural network 404 may be configured so that each neuron in a layer will have the same or a similar connectivity pattern, but with connections strengths that may have different values (e.g., 410, 412, 414, and 416). The locally connected connectivity pattern may give rise to spatially distinct receptive fields in a higher layer, because the higher layer neurons in a given region may receive inputs that are tuned through training to the properties of a restricted portion of the total input to the network.

Figure 4C:
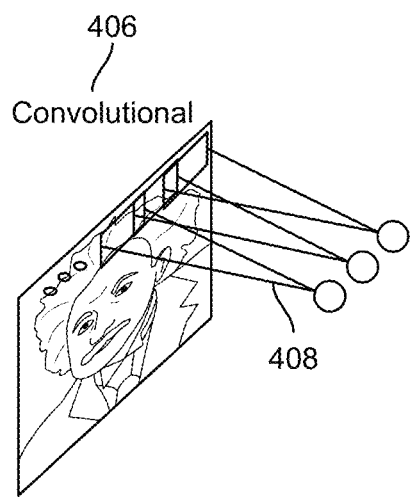
FIG. 4C is a diagram illustrating an example of a convolutional neural network (CNN), in accordance with some examples of the present disclosure.

One example of a locally connected neural network is a convolutional neural network. FIG. 4C illustrates an example of a convolutional neural network 406. The convolutional neural network 406 may be configured such that the connection strengths associated with the inputs for each neuron in the second layer are shared (e.g., 408). Convolutional neural networks may be well suited to problems in which the spatial location of inputs is meaningful. Convolutional neural network 406 may be used to perform one or more aspects of video compression and/or decompression, according to aspects of the present disclosure.

Figure 4D:
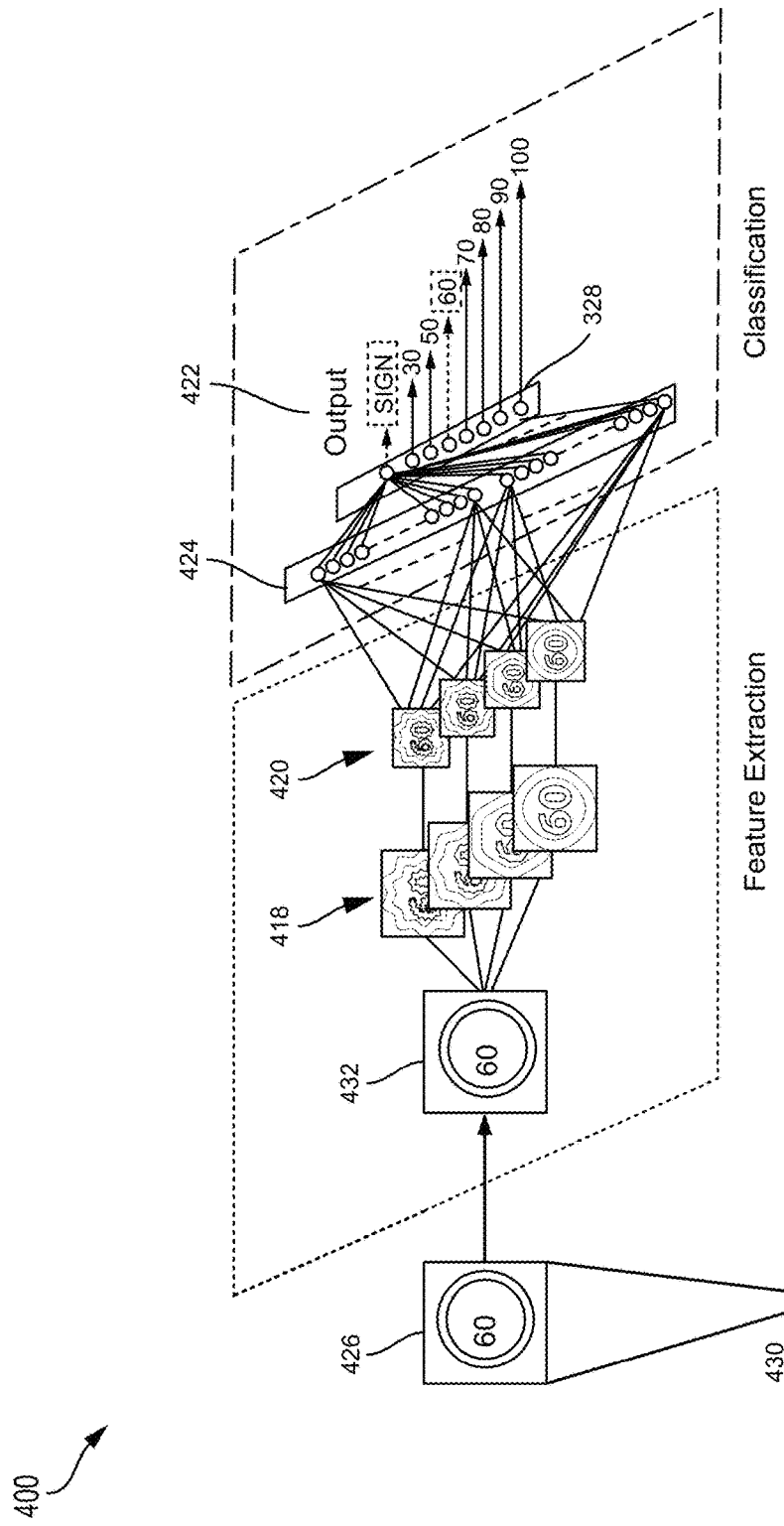
FIG. 4D is a diagram illustrating an example of a deep convolutional network (DCN) for recognizing visual features from an image, in accordance with some examples of the present disclosure.

One type of convolutional neural network is a deep convolutional network (DCN). FIG. 4D illustrates a detailed example of a DCN 400 designed to recognize visual features from an image 426 input from an image capturing device 430, such as an image capture and processing system 100 of FIG. 1. The DCN 400 of the current example may be trained to identify traffic signs and a number provided on the traffic sign. Of course, the DCN 400 may be trained for other tasks, such as identifying lane markings or identifying traffic lights.

The DCN 400 may be trained with supervised learning. During training, the DCN 400 may be presented with an image, such as the image 426 of a speed limit sign, and a forward pass may then be computed to produce an output 422. The DCN 400 may include a feature extraction section and a classification section. Upon receiving the image 426, a convolutional layer 432 may apply convolutional kernels (not shown) to the image 426 to generate a first set of feature maps 418. As an example, the convolutional kernel for the convolutional layer 432 may be a 5×5 kernel that generates 28×28 feature maps. In the present example, because four different feature maps are generated in the first set of feature maps 418, four different convolutional kernels were applied to the image 426 at the convolutional layer 432. The convolutional kernels may also be referred to as filters or convolutional filters.

The first set of feature maps 418 may be subsampled by a max pooling layer (not shown) to generate a second set of feature maps 420. The max pooling layer reduces the size of the first set of feature maps 418. That is, a size of the second set of feature maps 420, such as 14×14, is less than the size of the first set of feature maps 418, such as 28×28. The reduced size provides similar information to a subsequent layer while reducing memory consumption. The second set of feature maps 420 may be further convolved via one or more subsequent convolutional layers (not shown) to generate one or more subsequent sets of feature maps (not shown).

In the example of FIG. 4D, the second set of feature maps 420 is convolved to generate a first feature vector 424.

Furthermore, the first feature vector 424 is further convolved to generate a second feature vector 428. Each feature of the second feature vector 428 may include a number that corresponds to a possible feature of the image 426, such as "sign," "60," and "100." A softmax function (not shown) may convert the numbers in the second feature vector 428 to a probability. As such, an output 422 of the DCN 400 is a probability of the image 426 including one or more features.

In the present example, the probabilities in the output 422 for "sign" and "60" are higher than the probabilities of the others of the output 422, such as "30," "40," "50," "70," "80," "90," and "100". Before training, the output 422 produced by the DCN 400 is likely to be incorrect. Thus, an error may be calculated between the output 422 and a target output. The target output is the ground truth of the image 426 (e.g., "sign" and "60"). The weights of the DCN 400 may then be adjusted so the output 422 of the DCN 400 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images and a forward pass through the network may yield an output 422 that may be considered an inference or a prediction of the DCN.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., feature maps 420) receiving input from a range of neurons in the previous layer (e.g., feature maps 418) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction.

Figure 5:
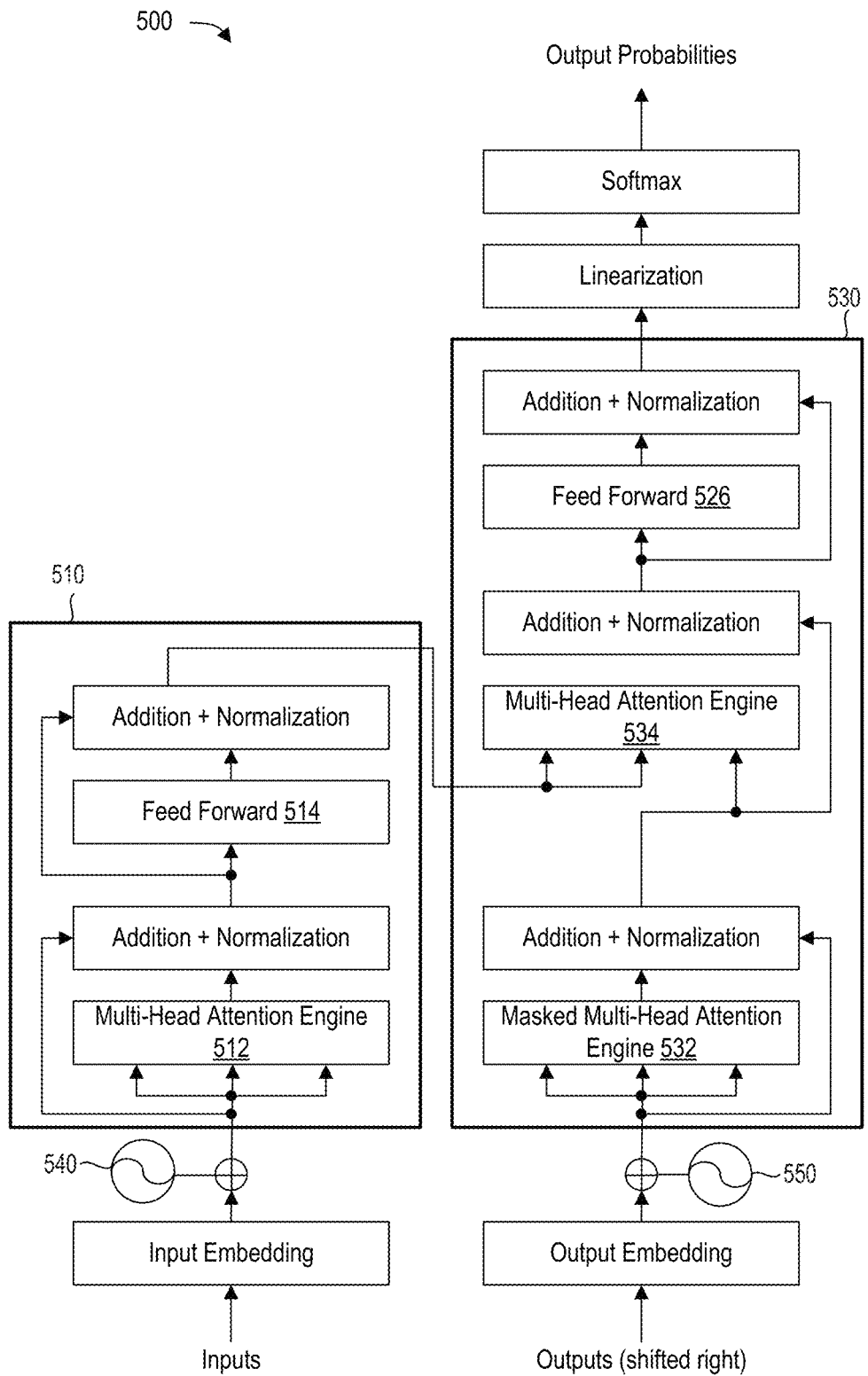
FIG. 5 is a block diagram of an example transformer, in accordance with some examples of the present disclosure.

FIG. 5 is a block diagram of an example transformer in accordance with some aspects of the disclosure. In a convolutional neural network (CNN) model, the number of operations required to relate signals from two arbitrary input or output positions grows in the distance between positions, which makes learning dependencies at different distant positions challenging for a CNN model. A transformer 500 reduces the operations of learning dependencies by using an encoder 510 and a decoder 530 that implement an attention mechanism at different positions of a single sequence to compute a representation of that sequence. An attention function can be described as mapping a query and a set of key-value pairs to an output, where the query, keys, values, and output are all vectors. The output is computed as a weighted sum of the values, where the weight assigned to each value is computed by a compatibility function of the query with the corresponding key.

In one example of a transformer, the encoder 510 is composed of a stack of six identical layers and each layer has two sub-layers. The first sub-layer is a multi-head self-attention engine 512, and the second sub-layer is a fully connected feed-forward network 514. A residual connection (not shown) connects around each of the sub-layers followed by normalization.

In this example transformer 500, the decoder 530 is also composed of a stack of six (6) identical layers. The decoder also includes a masked multi-head self-attention engine 532, a multi-head attention engine 534 over the output of the encoder 510, and a fully connected feed-forward network 526. Each layer includes a residual connection (not shown) around the layer, which is followed by layer normalization. The masked multi-head self-attention engine 532 is masked to prevent positions from attending to subsequent positions and ensures that the predictions at position i can depend only on the known outputs at positions less than i (e.g., auto-regression).

In the transformer, the queries, keys, and values are linearly projected by a multi-head attention engine into learned linear projects, and then attention is performed in parallel on each of the learned linear projects, which are concatenated and then projected into final values.

The transformer also includes a positional encoder 540 to encode positions because the model does not contain recurrence and convolution and relative or absolute position of the tokens is needed. In the transformer 500, the positional encodings are added to the input embeddings at the bottom layer of the encoder 510 and the decoder 530. The positional encodings are summed with the embeddings because the positional encodings and embeddings have the same dimensions. A corresponding position decoder 550 is configured to decode the positions of the embeddings for the decoder 530.

In some aspects, the transformer 500 uses self-attention mechanisms to selectively weigh the importance of different parts of an input sequence during processing and allows the model to attend to different parts of the input sequence while generating the output. The input sequence is first embedded into vectors and then passed through multiple layers of self-attention and feed-forward networks. The transformer 500 can process input sequences of variable length, making it well-suited for natural language processing tasks where input lengths can vary greatly. Additionally, the self-attention mechanism allows the transformer 500 to capture long-range dependencies between words in the input sequence, which is difficult for RNNs and CNNs. The transformer with self-attention has achieved results in several natural language processing tasks that are beyond the capabilities of other neural networks and has become a popular choice for language and text applications. For example, the various large language models, such as a generative pretrained transformer (e.g., ChatGPT, etc.) and other current models are types of transformer networks.

As previously mentioned, XR systems typically perform feature analysis (e.g., extraction, semantic segmentation, object tracking, etc.) and other complex functions to display an output based on those functions to their users. In some cases, XR devices have cameras that are mounted in a tilted orientation with respect to a normal, horizon-aligned orientation (e.g., a horizontal axis) of a scene, such as a room. In these cases, the feature analysis can result in an inaccurate output.

In one or more examples, XR devices can perform semantic segmentation by generating semantic labels for objects in captured images. Semantic segmentation is a computer vision task that assigns a class label to pixels within an image by using a machine learning algorithm (e.g., using a neural network). Semantic segmentation tasks aid machines to distinguish between different object classes and background regions within an image. Semantic segmentation of images (along with the creation of semantic maps) plays in important role in training computers to recognize important context in digital images (e.g., landscapes, people, medical images, etc.).

Much of the training data for networks (e.g., neural networks) for performing semantic segmentation (but not limited to the use cases of semantic segmentation, for example object detection uses cases may be applicable as well) includes images that are in a natural, horizon-aligned orientation (e.g., in indoor environments, where a ceiling is located at the top of the image, and a floor is located at the bottom of the image). However, many XR devices have tracking cameras that are mounted in a tilted orientation (e.g., tilted with respect to the natural, horizon-aligned orientation) due to one or more reasons, such as to maximize scene coverage and/or overlap.

When training a network (e.g., a neural network) on images that are in a natural, horizon-aligned orientation (e.g., a first type of images), and deploying that network onto to a device (e.g., an XR device) for inference with images that are not aligned with the natural, horizon-aligned orientation (e.g., a second type of images, which are in the tilted orientation of the cameras), the results (e.g., output) can be unsatisfactory. For these cases, in order to produce a more accurate output, either massive amounts of new data is needed in the corresponding orientation (e.g., images that are in the tilted orientation of the cameras), or the input images (e.g. images that are in the natural, horizon-aligned orientation) need to be preprocessed at inference time by applying a rotation operation (e.g., rotating the images that are in the natural, horizon-aligned orientation to match the tilted orientation of the cameras).

Figure 6:
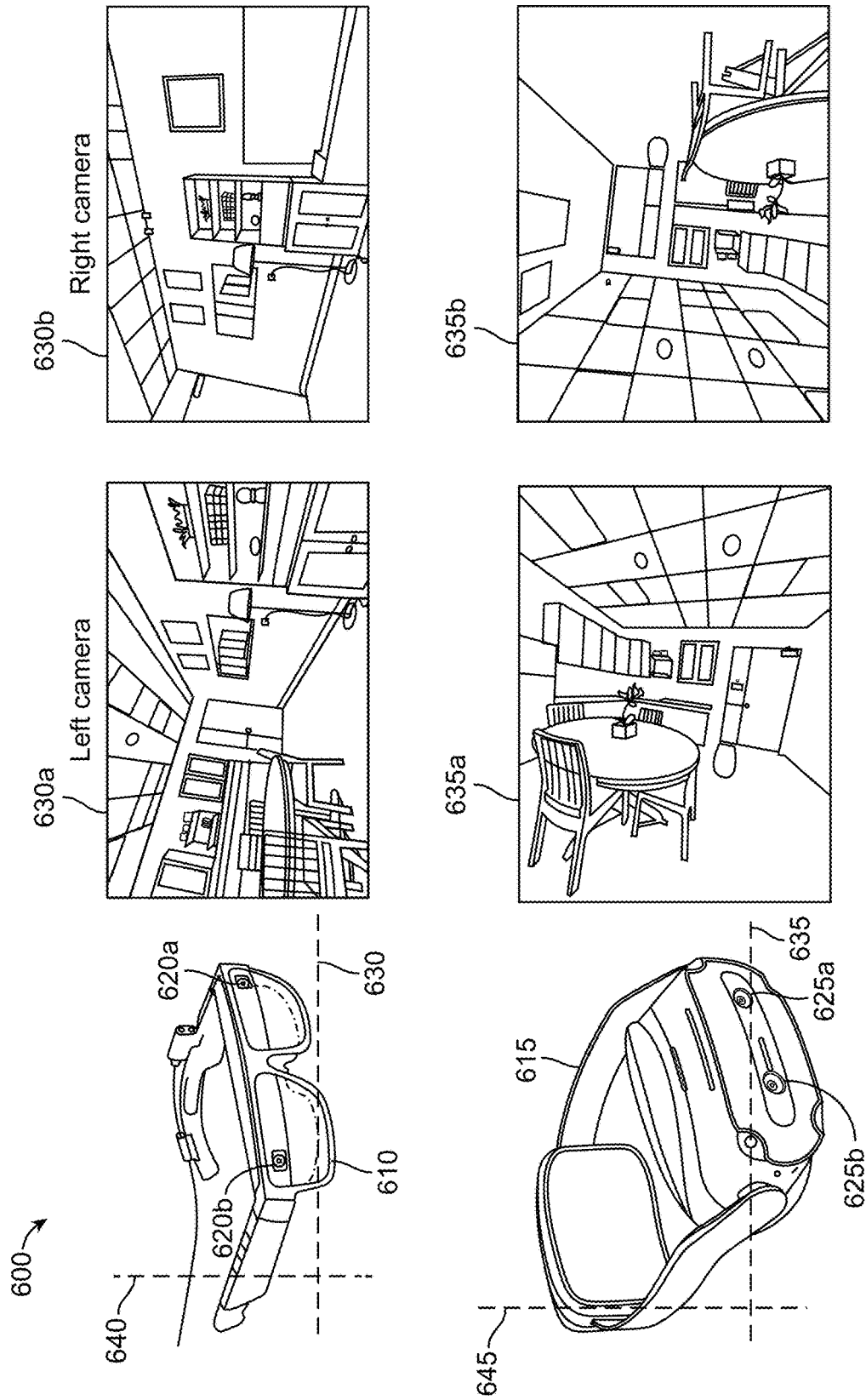
FIG. 6 is a diagram illustrating examples of devices with different camera orientations, in accordance with some examples of the present disclosure.

FIG. 6 shows examples of devices with cameras mounted in different orientations. In particular, FIG. 6 is a diagram illustrating examples 600 of devices 610, 615 with different camera orientations. In FIG. 6, the devices 610, 615 are shown to be in the form of HMDs (e.g., XR devices). The devices 610, 615 can have multiple tracking cameras 620a, 620b, 625a, 625b that can be used for 6 DoF pose estimation.

The device 610 (e.g., a Lenovo A3 HMD) is shown to have a left camera 620a and a right camera 620b. When the device 610 is mounted onto a head of a user, the device 610 has a natural, horizon-aligned orientation. The cameras 620a, 620b are mounted onto the device 610 such that the cameras 620a, 620b each have a natural, horizon-aligned orientation (e.g., the cameras 620a, 620b are aligned with a horizontal axis 630 of the device 610, which when mounted onto a user's head, has a natural, horizon-aligned orientation). As such, the cameras 620a, 620b are each aligned with a horizontal axis 630 of the device 610. A vertical axis 640 of the device 610 is shown to be perpendicular to the horizonal axis 630 of the device 610.

Image 630a is an example image of a scene (e.g., a room) captured by the left camera 620a of the device 610, and image 630b is an example image of the scene (e.g., the room) captured by the right camera 620b of the device 610. The images 630a, 630b are each shown to be horizontally aligned with the scene (e.g., have a natural, horizon-aligned orientation, aligned with the horizontal axis 630 of the device 610, and are aligned with a horizon (e.g., a horizontal axis) of the scene).

The device 615 (e.g., a Lenovo VRX HMD or a Meta Quest HMD) is shown to have a left camera 625a and a right camera 625b. When the device 615 is mounted onto a head of a user, the device 615 has a natural, horizon-aligned orientation. The cameras 625a, 625b are mounted onto the device 615 such that the cameras 625a, 625b each have a tilted orientation with respect to the natural, horizon-aligned orientation. The cameras 625a, 625b are each aligned with a vertical axis 645 of the device 615, and the cameras 625a, 625b are vertically aligned with a horizontal axis 635 of the device 615. The vertical axis 645 of the device 615 is shown to be perpendicular to the horizonal axis 635 of the device 615.

Image 635a is an example image of a scene (e.g., the room) captured by the left camera 625a of the device 615, and image 635b is an example image of the scene (e.g., the room) captured by the right camera 625b of the device 615. The images 635a, 635b are each shown to be vertically aligned with the scene (e.g., have a tilted orientation, are aligned with the vertical axis 645 of the device 610, and are vertically aligned with a horizontal axis 635 of the device 615). The images 635a, 635b that are vertically aligned with the scene are rotated approximately 90 degrees (e.g., between 80 and 100 degrees) relative to the images 630a, 630b that are horizontally aligned with the scene.

As previously mentioned, much of the training data for networks (e.g., neural networks) for performing tasks (e.g., semantic segmentation or object detection) includes images that are in a natural, horizon-aligned orientation (e.g., images 630a, 630b). When deploying a network (e.g., a CNN), which has been trained on images that are in a natural, horizon-aligned orientation (e.g., images 630a, 630b), onto a device (e.g., device 615) that has cameras 625a, 625b in a tilted orientation, the results (e.g., output) of the task can be subpar (e.g., because CNNs, such as those used for semantic segmentation, are not rotationally equivariant by design).

Figure 7:
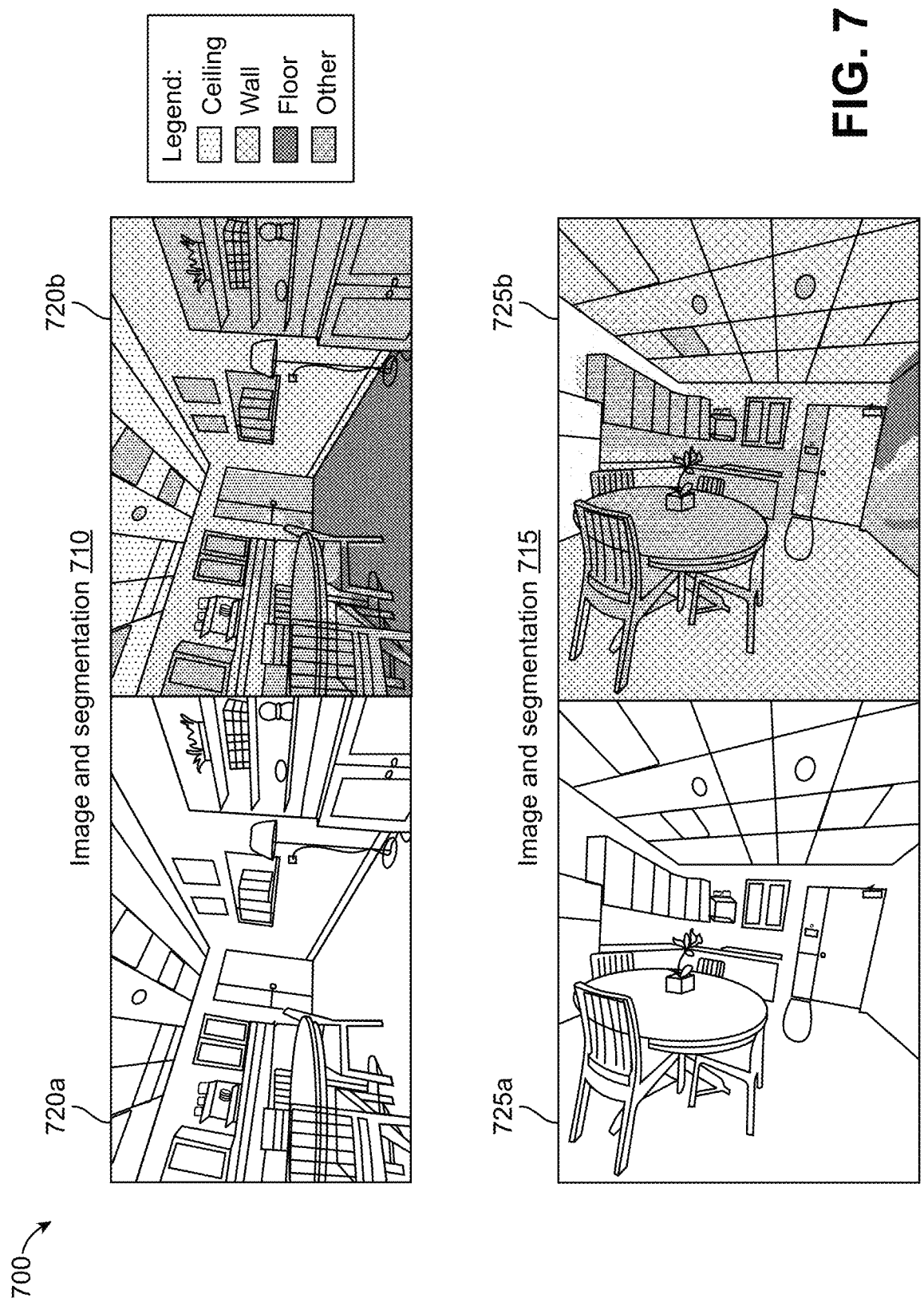
FIG. 7 is a diagram illustrating examples of semantic segmentation maps generated by devices with different camera orientations, in accordance with some examples of the present disclosure.

FIG. 7 shows a comparison of outputs (e.g., segmentation maps) of a task (e.g., semantic segmentation) performed by devices (e.g., devices 610, 615) with different camera orientations using a network trained on images in a natural, horizon-aligned orientation (e.g., images 630a, 630b). In particular, FIG. 7 is a diagram illustrating examples 700 of semantic segmentation maps 720b, 725b generated by devices (e.g., devices 610, 615 of FIG. 6) with different camera orientations.

In FIG. 7, an example of a semantic segmentation map 720b that has been generated based on an image 720a is shown. The device 610 (e.g., with cameras 630a, 630b in a natural, horizon-aligned orientation) captured the image 720a of a scene (e.g., the room). The image 720a is shown to be horizontally aligned with the scene (e.g., the room). The device 610 generated the semantic segmentation map 720b using a network that was trained with images that are horizontally aligned with a reference scene (e.g., which is similar to the scene). The resultant semantic segmentation map 720b is shown to have objects in the scene that are properly labeled.

In FIG. 7, an example of a semantic segmentation map 725b that has been generated based on an image 725a is shown. The device 615 (e.g., with cameras 635a, 635b in a tilted orientation) captured the image 725a of a scene (e.g., the room). The image 725a is shown to be vertically aligned with the scene (e.g., the room). The device 615 generated the semantic segmentation map 725b using a network that was trained with images that are horizontally aligned with a reference scene (e.g., which is similar to the scene). The resultant semantic segmentation map 725b is shown to have objects in the scene that are mislabeled.

In one or more examples, in order to improve the accuracy of the semantic segmentation for devices (e.g., device 615) with cameras in a titled orientation, the images (e.g., image 725a) may be rotated by 90 degrees in a counter-clockwise direction prior to performing the semantic segmentation on the images. However, this rotation requires non-negligible extra computational time as a rotation must be performed for every image frame in the input stream.

Alternatively, in order to improve the accuracy of the semantic segmentation for devices (e.g., device 615) with cameras in a titled orientation, the network may be trained on images that are vertically aligned with a reference scene (e.g., which is similar to the scene). However, this method has the disadvantage of not being able to effectively use models (e.g., networks) that are pretrained on large, publicly available datasets (e.g., which include images that are horizontally aligned with a reference scene and are in a natural, horizon-aligned orientation).

Therefore, improved systems and techniques for processing images obtained by cameras mounted in a tilted orientation with respect to a normal, horizon-aligned orientation can be useful.

In one or more aspects, the systems and techniques provide network weight rotation for oriented camera images. In one or more examples, the systems and techniques provide for improved image processing of images obtained by cameras mounted in a tilted orientation with respect to a normal, horizon-aligned orientation.

In one or more examples, for the systems and techniques, when cameras are mounted on a device (e.g., an XR device, such as device 615 of FIG. 6)) such that the cameras have a tilting angle that is a multiple of ninety (90) degrees (or approximately close to that, such as eighty (80) to one hundred (100) degrees) with respect to a natural, horizon-aligned orientation, after training a network (e.g., a neural network) on images that are in the natural, horizon-aligned orientation, the resultant network weights of the network may be rotated to generate rotated weights. The network with the rotated weights may then be deployed onto the device to produce an accurate output (e.g., an accurate semantic segmentation map), without the need of costly image preprocessing.

Fully convolutional networks, such as those that are typically used for semantic segmentation, have kernels of rectangular shape that are amenable to a 90 degree rotation (or a multiple thereof), such that if the image is tilted by a multiple of 90 degrees with respect to the natural, horizon-aligned orientation, there would be no degradation in accuracy. This kernel rotation may be done once after training the network, and is computationally low cost.

When the network with the rotated weights is deployed onto a device (e.g., an XR device, such as device 615 of FIG. 6) that captures tilted images (e.g., images that are not aligned with the natural, horizon-aligned orientation, such as image 635a of FIG. 6), a significant amount of energy can be saved by not performing a preprocessing task of rotating the tilted images to the training data orientation (e.g., the natural, horizon-aligned orientation). The systems and techniques allow for a network (e.g., a neural network) to be trained on a large amount of images that are aligned with a natural, horizon-aligned orientation, and then to deploy the network with rotated weights (e.g., in a clockwise and/or a counterclockwise direction) onto the devices with cameras mounted with an approximately 90, 180, or 270 degrees tilt angle with respect to the natural, horizon-aligned orientation.

As previously mentioned, some XR devices (e.g., VR/AR devices) have cameras with natural, horizon-aligned camera orientations. However, most XR devices have tilted cameras, which may make a network (e.g., a neural network, such as a convolutional neural network ((CNN), during performance of semantic segmentation, misclassify regions with learnt spatial priors where, for example, a ceiling is located at the top of an image and a floor is located at the bottom of the image. In order to avoid a preprocessing time of rotating the input image (e.g., image 635a of FIG. 6) or a training on rotated image datasets, the weights of the network can be rotated rather than rotating the images.

Figure 8:
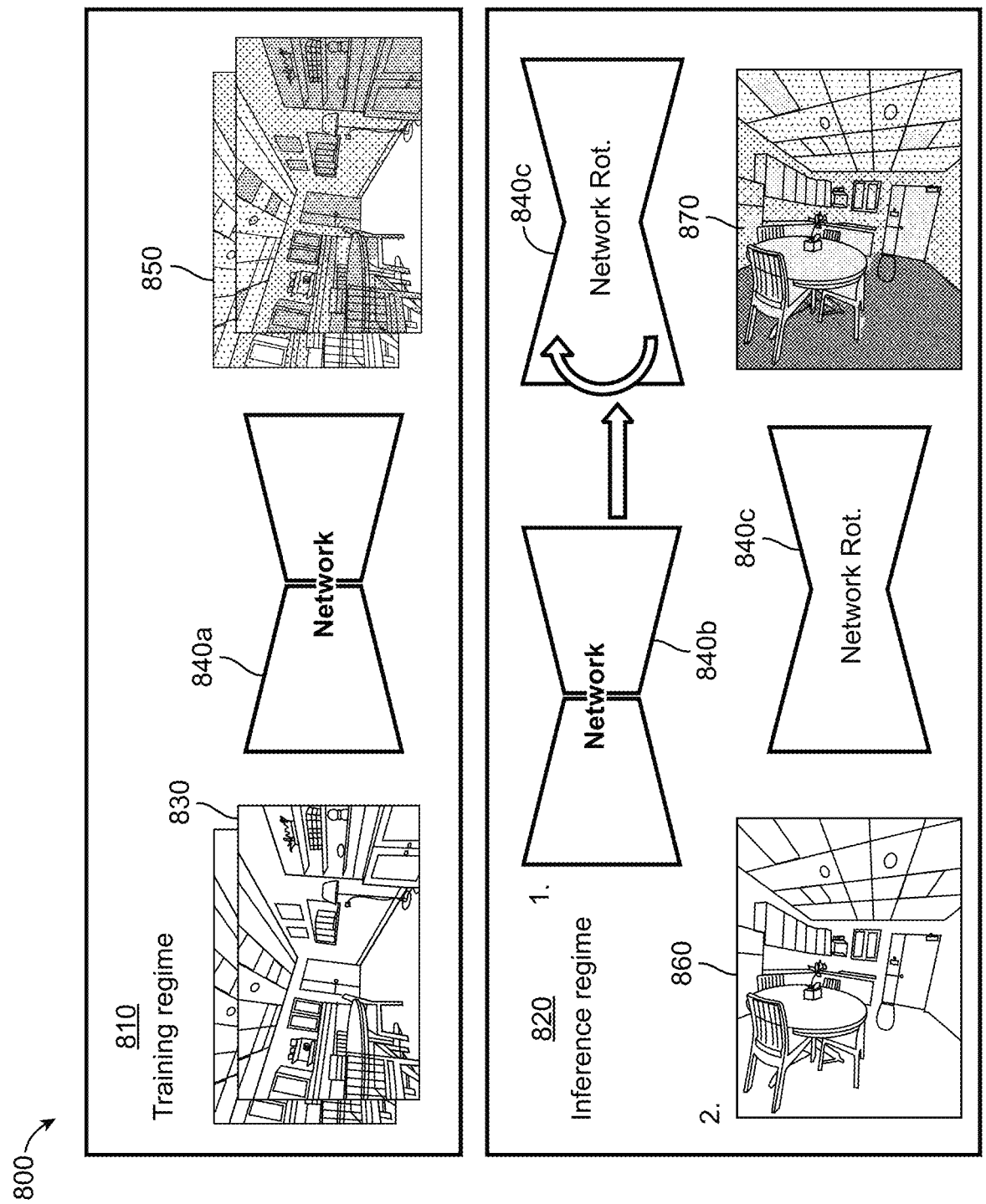
FIG. 8 is a diagram illustrating an example of a process for network weight rotation for oriented camera images, in accordance with some examples of the present disclosure.

FIG. 8 shows an example process for the systems and techniques that employ network weight rotation. In one or more examples, in summary of the process, a network is trained on images in a natural, horizon-aligned orientation, the resultant weights from the training are then rotated by a multiple of ninety degrees to match the orientation of a camera (e.g., with a tilted orientation) to generate a network (e.g., a rotated network) with rotated weights, and the network with the rotated weights is then deployed onto the device (e.g., XR device) with the camera (e.g. with the tilted orientation) for use.

In particular, FIG. 8 is a diagram illustrating an example of a process 800 for network weight rotation for oriented camera images. In FIG. 8, the process 800 is shown to be divided into a training regime 810 and an inference regime 820.

In one or more aspects, during operation of the process 800 for image processing at a device (e.g., device 615 of FIG. 6 with cameras having tilted orientations), during the training regime 810, a network (e.g., a pretrained network 840a, such as a fully convolutional network, for example SegNext) may be trained (e.g., to produce a trained network 840b) using a plurality of training images (e.g., including images 830) to generate a plurality of weights. In some examples, the device is a HMD.

In some examples, the plurality of training images are horizontally aligned with a reference scene (e.g., a scene captured by the plurality of training images). In one or more examples, at least a portion of the plurality of training images may be from publicly and commercially available datasets (e.g., ImageNet, ScanNet, ADE-20K, etc.). FIG. 8 shows corresponding semantic segmentation maps 850 generated based on the training images (e.g., including images 830).

During the inference regime 820, the plurality of weights (e.g., in the trained network 840b) are rotated to generate rotated weights (e.g., to produce a rotated network 840c). An image sensor (e.g., a camera, such as camera 625a of FIG. 6, with a titled orientation, of the device) can obtain (e.g., capture) an image 860 of a scene. The image 860 is vertically aligned with the scene. In one or more examples, the image sensor is vertically aligned with a horizontal axis (e.g., horizontal axis 635) of the device (e.g., device 615). In some examples, the image sensor can be a tracking camera for 6 DoF pose estimation.

The image 860 can then be processed (e.g., by the device) using the network (e.g., the rotated network 840c) with rotated weights to produce an output, such as a semantic segmentation map 870. In one or more examples, the device can receive, from another device (e.g., a remote device, such as a server), the neural network (e.g., the rotated network 840c) with the rotated weights. In some examples, based on processing the image using the network (e.g., neural network), a semantic segmentation map (e.g., semantic segmentation map 920 of FIG. 9) and/or an object detection output can be outputted.

In one or more examples, the plurality of training images that are horizontally aligned with the reference scene are rotated ninety (90) degrees relative to the image that is vertically aligned with the scene. In some examples, the plurality of training images that are horizontally aligned with the reference scene are aligned with a horizon (e.g., a horizontal axis) of the reference scene and the scene (e.g., such that that training images are in a natural, horizon-aligned orientation.

Figure 9:
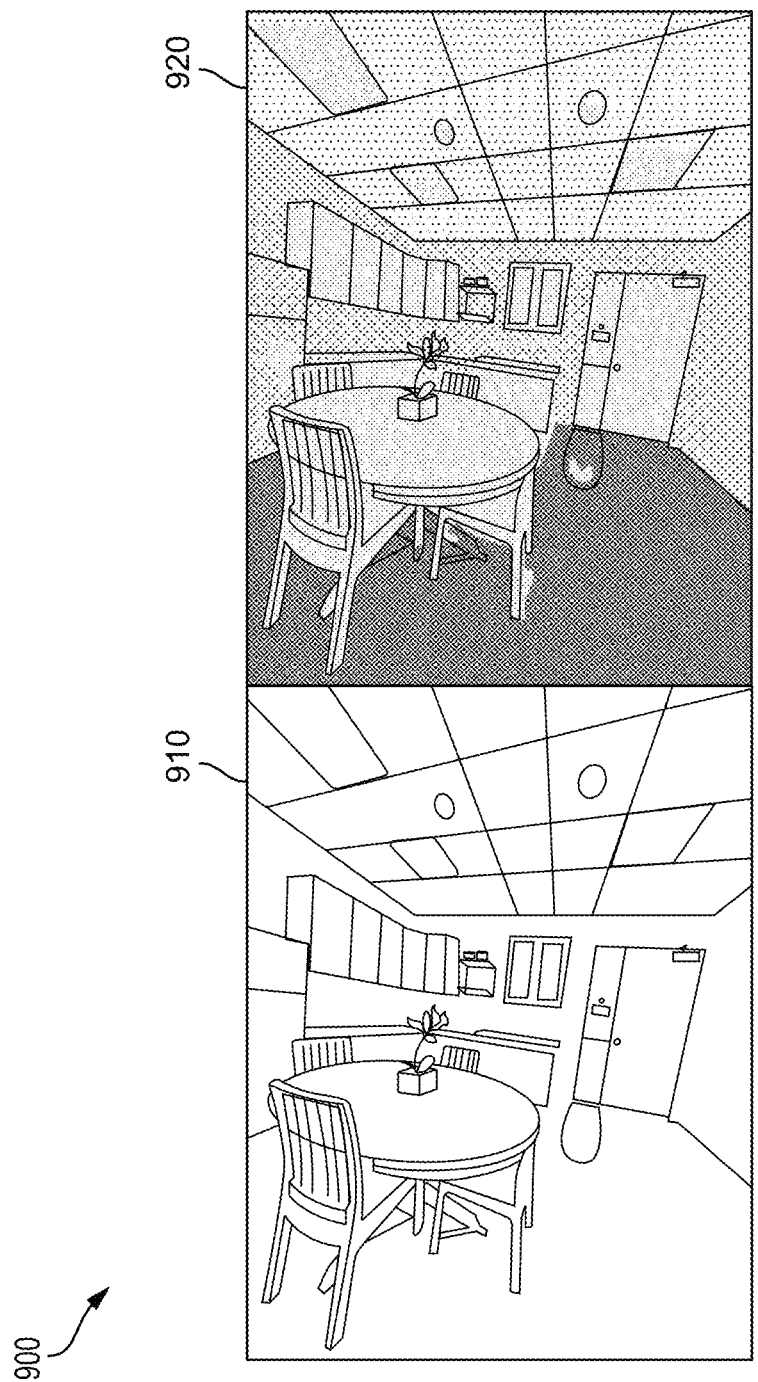
FIG. 9 is a diagram illustrating an example of a semantic segmentation map generated by a device with tilted cameras using a network with rotated weights, in accordance with some examples of the present disclosure.

FIG. 9 is a diagram illustrating an example of a semantic segmentation map 920 generated by a device (e.g., an HMD) with tilted cameras using a network with rotated weights. In FIG. 9, a device (e.g., such as device 615 with cameras 635a, 635b in a tilted orientation) captured the image 910 of a scene (e.g., a room). The image 910 is shown to be vertically aligned with the scene (e.g., the room). The device (e.g., device 615) generated the semantic segmentation map 920 using rotated weights from a network that was trained with images that are horizontally aligned with a reference scene (e.g., which is similar to the scene). The resultant semantic segmentation map 920 is shown to have objects in the scene that are properly labeled.

Figure 10:
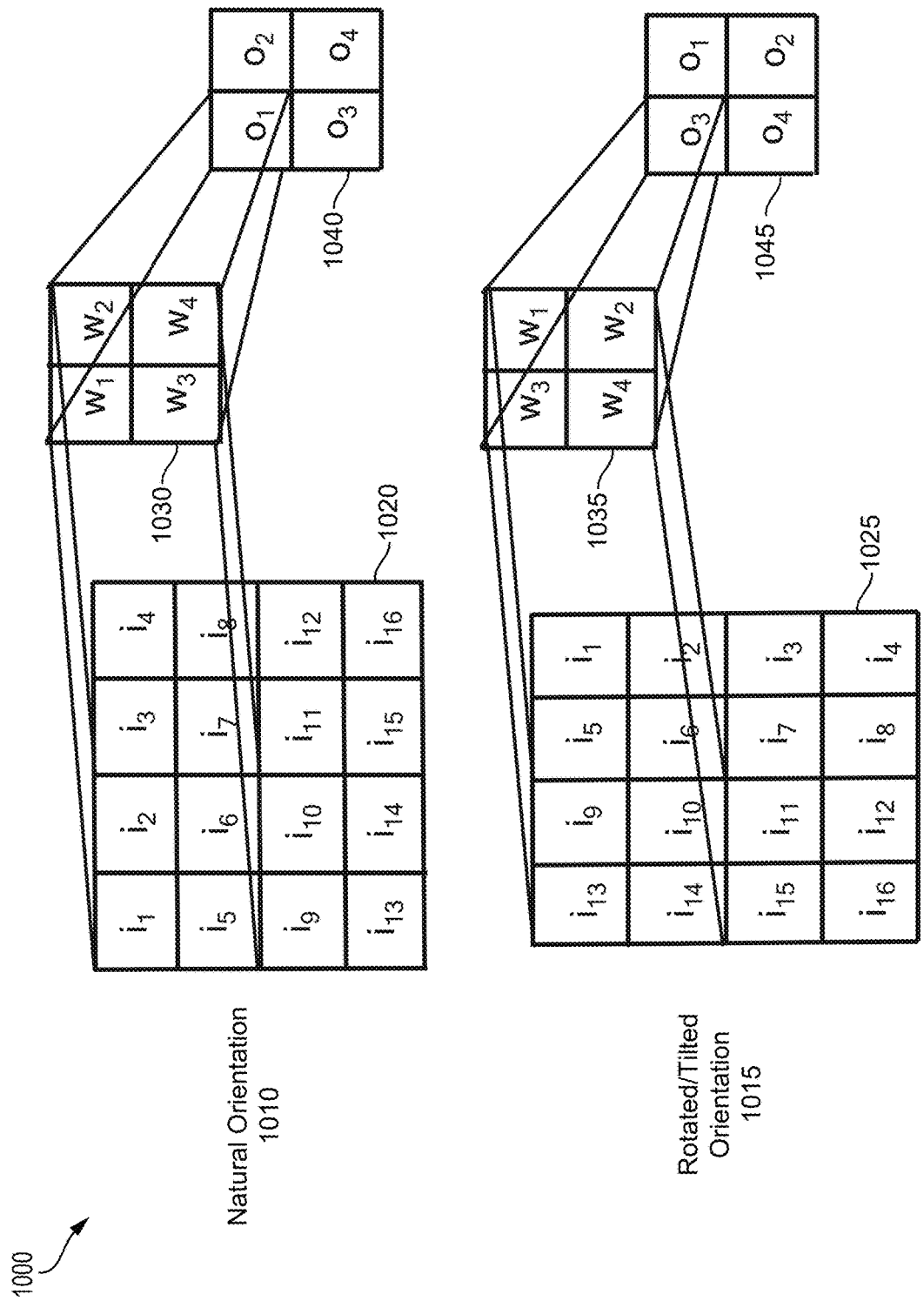
FIG. 10 is a diagram illustrating an example of weight rotations for a convolutional neural network, in accordance with some examples of the present disclosure.
Figure 11:
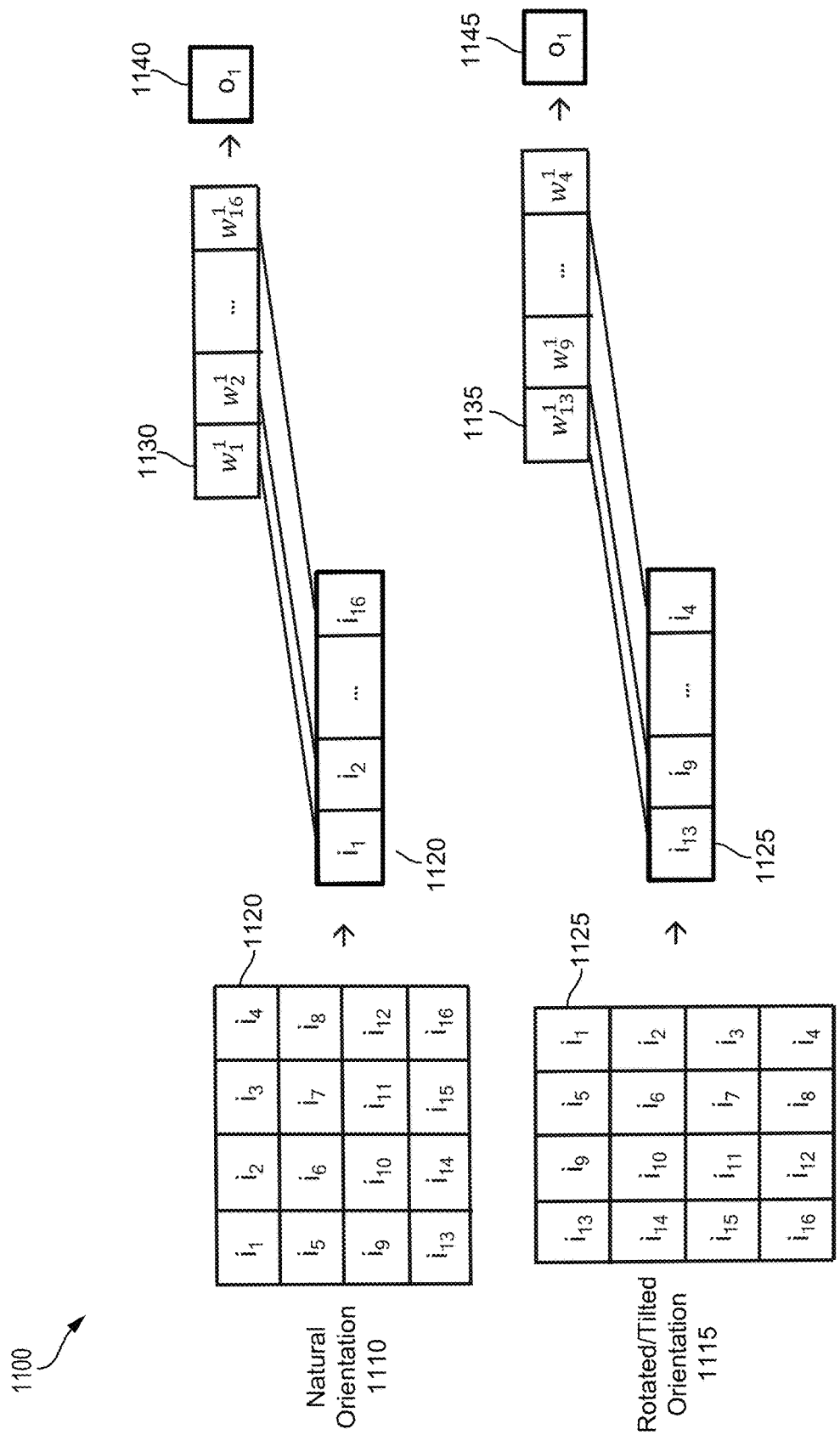
FIG. 11 is a diagram illustrating an example of weight permutations for a fully connected neural network, in accordance with some examples of the present disclosure.
Figure 12:
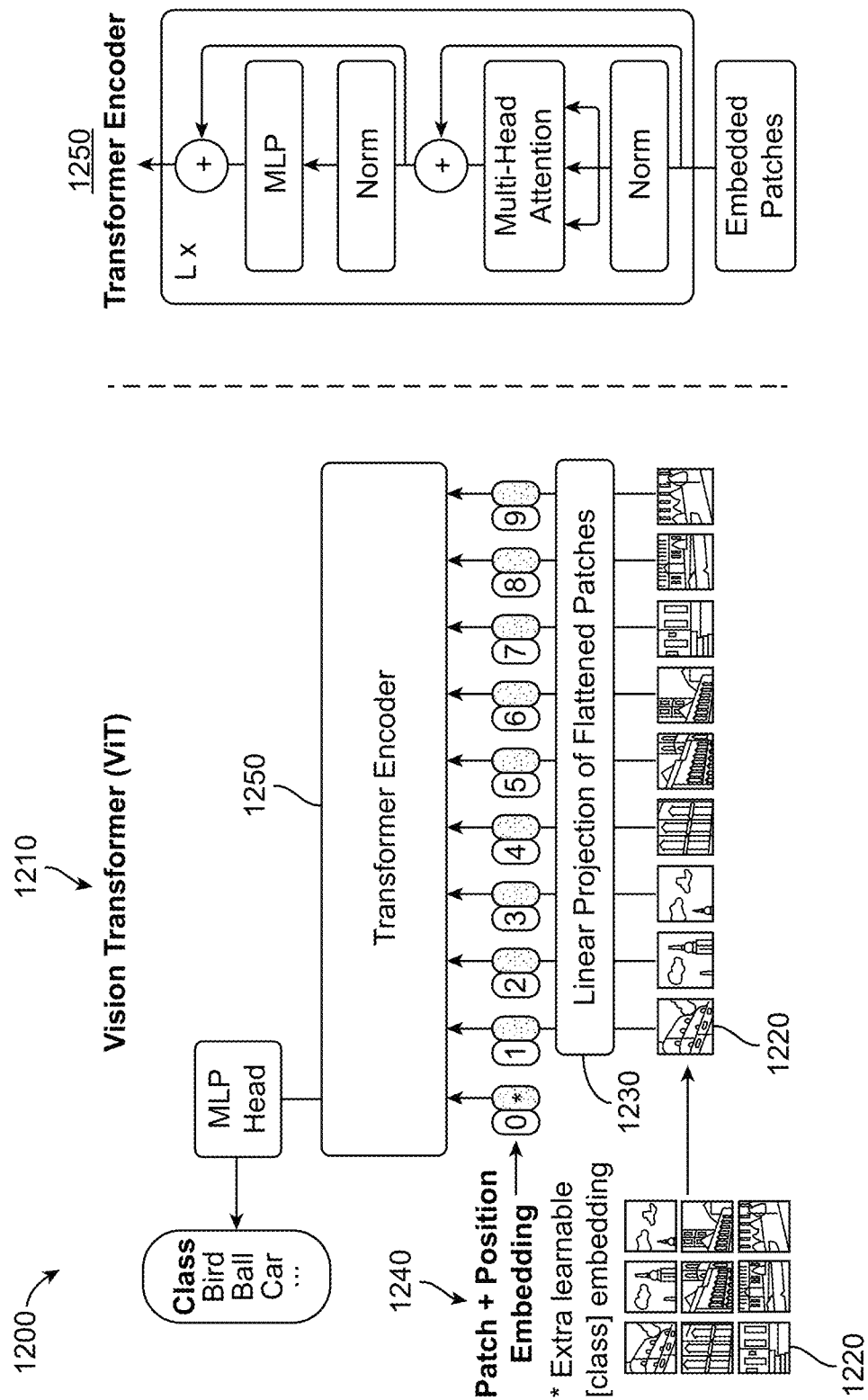
FIG. 12 is a diagram illustrating an example of weight adaptations for a vision transformer, in accordance with some examples of the present disclosure.

In one or more aspects, the network (e.g., of the process 800 of FIG. 8) may be a CNN, a fully connected neural network, or a vision transformer. FIGS. 10, 11, and 12 show examples of these different implementations.

FIG. 10 is a diagram illustrating an example 1000 of weight rotations for a CNN. FIG. 10 shows, for a natural, horizon-aligned orientation 1010, the working of a convolutional layer with a 4×4 input matrix (with sixteen input units 1020), a 2×2 kernel (e.g., with four weights 1030) with 2 horizontal and vertical strides, resulting in a 2×2 output matrix (e.g., with four output units 1040). The scalar bias b does not need rotation and, hence, can be ignored in this illustration.

Rotating the image and the kernel produces the rotated output, as follows:

$$o_1 = w_1 \cdot i_1 + w_2 \cdot i_2 + w_3 \cdot i_5 + w_4 \cdot i_6 + b$$

$$o_2 = w_1 \cdot i_3 + w_2 \cdot i_4 + w_3 \cdot i_7 + w_4 \cdot i_8 + b$$

$$o_3 = w_1 \cdot i_9 + w_2 \cdot i_{10} + w_3 \cdot i_{13} + w_4 \cdot i_{14} + b$$

$$o_4 = w_1 \cdot i_{11} + w_2 \cdot i_{12} + w_3 \cdot i_{15} + w_4 \cdot i_{16} + b$$

This output can be thought of as the input of the subsequent layer in a network. Therefore, to produce the final rotated prediction, every kernel in every layer needs to be rotated in the same way. In addition, swapping the vertical and horizontal components of the stride and padding can be performed. For example, a "stride" parameter is defined for a convolutional layer. The strid indicates how large the step is when sliding a convolutional kernel over the input, such as an image (e.g., a stride of 1 means that the kernel shifts one pixel, a stride of 2 means that the kernel shifts 2 pixels, etc.). A stride parameter can have horizontal and vertical components (e.g., the kernel may shift 1 pixel horizontally over the image but 2 pixels vertically). When the weights are rotated according to the systems and techniques described herein, the stride (and the padding) can be taken into account.

FIG. 10 also shows, for the tilted orientation 1015, a convolutional layer with a 4×4 input matrix (with sixteen input units 1025), a 2×2 kernel (e.g., with four weights 1035) with 2 horizontal and vertical strides, resulting in a 2×2 output matrix (e.g., with four output units 1045).

In one or more examples, a plurality of weights are included in at least one convolutional kernel. In some examples, the plurality of weights are rotated based on rotating the at least one convolutional kernel. In one or more examples, the at least one convolutional kernel is rotated by ninety degrees. In some examples, the plurality of weights are included in one or more convolutional layers. In one or more examples, vertical and horizontal components of a stride and/or a padding of the one or more convolutional layers are swapped to generate the rotated weights.

In some examples, the network (e.g., of the process 800 of FIG. 8) may include a fully connected layer. In some examples, the weights of a fully connected layer may not be rotated.

FIG. 11 is a diagram illustrating an example 1100 of weight permutations for a fully connected neural network. FIG. 11 shows, for a natural, horizon-aligned orientation 1110, a fully connected layer with a 4×4 input matrix (with sixteen input units 1120), a flattened (row-major) representation of the input (e.g., with sixteen input units 1120), a vector of weights (e.g., with sixteen weights 1130), and a resultant output unit 1140. The fully connected layer has two output units (e.g., including output unit 1140), operating on the flattened 16-dimensional input (with sixteen input units 1120). The two output units are as follows:

$$o_1 = w_1^1 \cdot i_1 + w_2^1 \cdot i_2 + \ldots + w_{16}^1 \cdot i_{16} + b^1$$

$$o_2 = w_1^2 \cdot i_1 + w_2^2 \cdot i_2 + \ldots + w_{16}^2 \cdot i_{16} + b^2$$

FIG. 11 also shows, for the tilted orientation 1115, a fully connected layer with a 4×4 input matrix (with sixteen input units 1125), a flattened (row-major) representation of the input (e.g., with sixteen input units 1125), a vector of weights (e.g., with sixteen weights 1135), and a resultant output unit 1145.

Unlike the convolutional layer, the fully connected layer requires a permutation of the weights in each neuron. However, the order of the output is the same as in the "natural, horizon-aligned orientation" case. Therefore, subsequent layers do not need to be manipulated.

FIG. 12 is a diagram illustrating an example 1200 of weight adaptations for a vision transformer. FIG. 12 shows an example of a vision transformer 1210. A vision transformer is an adaptation of the transformer architecture applied on sequences to imagery data.

Operation of the vision transformer 1210 consists of cutting an image into patches 1220, performing a linear projection of flattened patches 1230, applying a fully-connected layer to each patch 1220 resulting in an embedding (e.g., during patch and position embedding 1240), adding positional encoding to each embedding (e.g., during the patch and position embedding 1240), and inputting the result into a transformer encoder 1250.

Since the image rotation is known in advance, the image patches 1220 can be shuffled (similarly to the convolutional layer) and the linear layer weights can be shuffled (similarly to the fully-connected layer) to process the input in such a way that no shuffling or rotation in the embedding is needed. The downstream processing by the transformer encoder 1250 is then presented with the same orientation as during training. Therefore, similar to the fully-connected layer, this weight and patch reordering need only be applied on the first layer to face a rotated input, which can be the image or an output from preceding convolutional layers.

In one or more aspects, architectures can be utilized (e.g., for the network) that are a combination of convolutional, fully-connected, and transformer layers. In these cases, each manipulation outlined in FIGS. 10, 11, and 12 will need to be applied accordingly. However, the weights may be permuted in such a network in a way that matches the rotated input and produces the same output as the original network on the "natural, horizon-aligned orientation" with an applied rotation to it.

Figure 13:
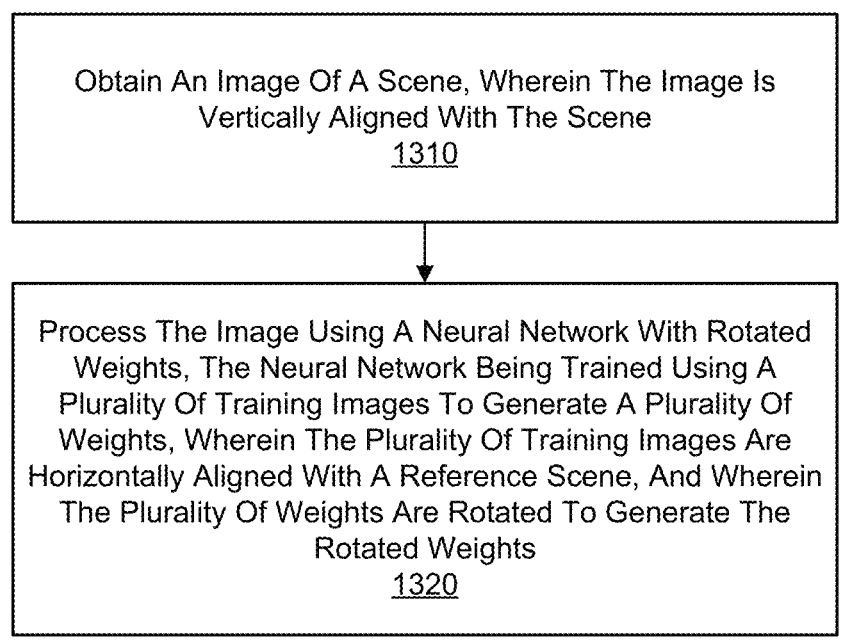
FIG. 13 is a flow diagram illustrating an example of a process for network weight rotation for oriented camera images, in accordance with aspects of the present disclosure.

FIG. 13 is a flow chart illustrating an example of a process 1300 for network weight rotation for oriented camera images. The process 1300 can be performed by a computing device (e.g., image capture and processing system 100 of FIG. 1 and/or a computing device or computing system 1400 of FIG. 14) or by a component or system (e.g., a chipset, one or more processors, one or more central processing units (CPUs), digital signal processors (DSPs), graphics processing units (GPUs), any combination thereof, and/or other type of processor(s), or other component or system) of the computing device. In one illustrative example, the computing device is an XR device, such as a VR, AR, and/or MR a head-mounted device (HMD) (e.g., the HMD 310 of FIG. 3A and/or FIG. 3B, the device 615 of FIG. 6, etc.) or glasses (e.g., the device 610 of FIG. 6, etc.). The operations of the process 1300 may be implemented as software components that are executed and run on one or more processors (e.g., processor 1410 of FIG. 14 or other processor(s)). Further, the transmission and reception of signals by the computing device in the process 1300 may be enabled, for example, by one or more antennas and/or one or more transceivers (e.g., wireless transceiver(s)).

At block 1310, the computing device (or component thereof) can obtain an image of a scene. The image is vertically aligned with the scene (e.g., the image 630*a* or the image 630*b* of FIG. 6). In some aspects, the computing device (or component thereof, such as an image sensor of the computing device) can capture the image of the scene. For instance, an image sensor of the computing device can capture the image of the scene. The image sensor can be vertically aligned (e.g., at 90 degrees or between 80 and 100 degrees) with a horizontal axis of the computing device (e.g., the horizontal axis 635 of the device 615 of FIG. 6). In one illustrative example, the image sensor can be a tracking camera for six degrees of freedom pose estimation. In other examples, the image sensor can be another type of camera, such as a camera for capturing images for display or further processing (e.g., for object detection, for depth detection, etc.). In some cases, the image can be captured using another type of sensor, such as a depth sensor.

At block 1320, the computing device (or component thereof) can process the image using a neural network with rotated weights. The neural network is trained using a plurality of training images to generate a plurality of weights. The plurality of training images are horizontally aligned with a reference scene (e.g., the training images 830 of FIG. 8). In some cases, the plurality of training images that are horizontally aligned with the reference scene are rotated ninety degrees relative to the image that is vertically aligned with the scene. In some aspects, the plurality of training images that are horizontally aligned with the reference scene are aligned with a horizon of the reference scene and the scene.

The plurality of weights are rotated (e.g., by ninety degrees) to generate the rotated weights. In some aspects, the plurality of weights can be included in one or more convolutional layers. In some cases, the plurality of weights are included in at least one convolutional kernel (e.g., of the one or more convolutional layers). In such cases, the plurality of weights are rotated based on rotating the at least one convolutional kernel. In some examples, vertical and horizontal components of a stride and/or a padding of the one or more convolutional layers are swapped to generate the rotated weights. The weights can be rotated in a clockwise and/or counterclockwise direction. In some aspects, the weights can be rotated in a clockwise direction to generate a first set of rotated weights (e.g., a first rotated convolutional kernel) and can be rotated in a counterclockwise direction to generate a second set of rotated weights (e.g., a second rotated convolutional kernel).

In some aspects, the neural network is or includes a convolutional neural network, a fully connected neural network, or a vision transformer. In some cases, the neural network includes a fully connected layer, and weights of the fully connected layer are not rotated. In such cases, the neural network can also include the one or more convolutional layers, and the weights of the one or more convolutional layers are rotated as described previously.

In some cases, the computing device (or component thereof, such as a receiver or transceiver) can receive, from a device, the neural network with the rotated weights. For instance, the computing device may include an HMD that receives the neural network with the rotated weights from a server, a mobile device, or other device.

In some aspects, the computing device (or component thereof) can output, based on processing the image using the neural network, a semantic segmentation map, an object detection output, and/or other type of output.

In some cases, the computing device of process 1300 may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces may be configured to communicate and/or receive wired and/or wireless data, including data according to the 3G, 4G, 5G, and/or other cellular standard, data according to the Wi-Fi (802.11x)

standards, data according to the Bluetooth™ standard, data according to the Internet Protocol (IP) standard, and/or other types of data.

The components of the computing device of process 1300 can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The process 1300 is illustrated as a logical flow diagram, the operations of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, process 1300 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 14 is a block diagram illustrating an example of a computing system 1400, which may be employed for network weight rotation for oriented camera images. In particular, FIG. 14 illustrates an example of computing system 1400, which can be for example any computing device making up internal computing system, a remote computing system, a camera, or any component thereof in which the components of the system are in communication with each other using connection 1405. Connection 1405 can be a physical connection using a bus, or a direct connection into processor 1410, such as in a chipset architecture. Connection 1405 can also be a virtual connection, networked connection, or logical connection.

In some aspects, computing system 1400 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 1400 includes at least one processing unit (CPU or processor) 1410 and connection 1405 that communicatively couples various system components including system memory 1415, such as read-only memory (ROM) 1420 and random access memory (RAM) 1425 to processor 1410. Computing system 1400 can include a cache 1412 of high-speed memory connected directly with, in close proximity to, or integrated as part of processor 1410.

Processor 1410 can include any general purpose processor and a hardware service or software service, such as services 1432, 1434, and 1436 stored in storage device 1430, configured to control processor 1410 as well as a special-purpose processor where software instructions are incorporated into the actual processor design. Processor 1410 may essentially be a completely self-contained computing system, containing multiple cores or processors, a bus, memory controller, cache, etc. A multi-core processor may be symmetric or asymmetric.

To enable user interaction, computing system 1400 includes an input device 1445, which can represent any number of input mechanisms, such as a microphone for speech, a touch-sensitive screen for gesture or graphical input, keyboard, mouse, motion input, speech, etc. Computing system 1400 can also include output device 1435, which can be one or more of a number of output mechanisms. In some instances, multimodal systems can enable a user to provide multiple types of input/output to communicate with computing system 1400.

Computing system 1400 can include communications interface 1440, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 1440 may also include one or more range sensors (e.g., LiDAR sensors, laser range finders, RF radars, ultrasonic sensors, and infrared (IR) sensors) configured to collect data and provide measurements to processor 1410, whereby processor 1410 can be configured to perform determinations and calculations needed to obtain various measurements for the one or more range sensors. In some examples, the measurements can include time of flight, wavelengths, azimuth angle, elevation angle, range, linear velocity and/or angular velocity, or any combination thereof. The communications interface 1440 may also include one or more Global Navigation Satellite System (GNSS) receivers or transceivers that are used to determine a location of the computing system 1400 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1430 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 1430 can include software services, servers, services, etc., that when the code that defines such software is executed by the processor 1410, it causes the system to perform a function. In some aspects, a hardware service that performs a particular function can include the software component stored in a computer-readable medium in connection with the necessary hardware components, such as processor 1410, connection 1405, output device 1435, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, engines, circuits, and algorithm steps described in connection with the embodiments disclosed herein may be implemented as electronic hardware, computer software, firmware, or combinations thereof. To clearly illustrate this interchangeability of hardware and software, various illustrative components, blocks, engines, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as engines, modules, or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1. An apparatus for image processing, the apparatus comprising: at least one memory; and at least one processor coupled to the at least one memory and configured to: obtain an image of a scene, wherein the image is vertically aligned with the scene; and process the image using a neural network with rotated weights, the neural network being trained using a plurality of training images to generate a plurality of weights, wherein the plurality of training images are horizontally aligned with a reference scene, and wherein the plurality of weights are rotated to generate the rotated weights.

Aspect 2. The apparatus of Aspect 1, further comprising an image sensor configured to capture the image of the scene.

Aspect 3. The apparatus of Aspect 2, wherein the image sensor is vertically aligned with a horizontal axis of the apparatus.

Aspect 4. The apparatus of any of Aspects 2 or 3, wherein the image sensor is a tracking camera for six degrees of freedom pose estimation.

Aspect 5. The apparatus of any of Aspects 1 to 4, wherein the plurality of training images that are horizontally aligned with the reference scene are rotated ninety degrees relative to the image that is vertically aligned with the scene.

Aspect 6. The apparatus of any of Aspects 1 to 5, wherein the plurality of training images that are horizontally aligned with the reference scene are aligned with a horizon of the reference scene and the scene.

Aspect 7. The apparatus of any of Aspects 1 to 6, wherein the neural network is one of a convolutional neural network, a fully connected neural network, or a vision transformer.

Aspect 8. The apparatus of any of Aspects 1 to 7, wherein the at least one processor is configured to output, based on processing the image using the neural network, at least one of a semantic segmentation map or an object detection output.

Aspect 9. The apparatus of any of Aspects 1 to 8, wherein the plurality of weights are included in at least one convolutional kernel.

Aspect 10. The apparatus of Aspect 9, wherein the plurality of weights are rotated based on rotating the at least one convolutional kernel.

Aspect 11. The apparatus of Aspect 10, wherein the at least one convolutional kernel is rotated by ninety degrees.

Aspect 12. The apparatus of any of Aspects 1 to 11, wherein the plurality of weights are included in one or more convolutional layers.

Aspect 13. The apparatus of Aspect 12, wherein vertical and horizontal components of at least one of a stride or a padding of the one or more convolutional layers are swapped to generate the rotated weights.

Aspect 14. The apparatus of any of Aspects 1 to 13, wherein the neural network comprises a fully connected layer, and wherein weights of the fully connected layer are not rotated.

Aspect 15. The apparatus of any of Aspects 1 to 14, wherein the apparatus is a head-mounted device (HMD).

Aspect 16. The apparatus of any of Aspects 1 to 15, wherein the at least one processor is configured to receive, from a device, the neural network with the rotated weights.

Aspect 17. A method of image processing at a device, the method comprising: obtaining an image of a scene, wherein the image is vertically aligned with the scene; and processing the image using a neural network with rotated weights, the neural network being trained using a plurality of training images to generate a plurality of weights, wherein the plurality of training images are horizontally aligned with a reference scene, and wherein the plurality of weights are rotated to generate the rotated weights.

Aspect 18. The method of Aspect 17, further comprising capturing, using an image sensor, the image of the scene.

Aspect 19. The method of Aspect 18, wherein the image sensor is vertically aligned with a horizontal axis of the device.

Aspect 20. The method of any of Aspects 18 or 19, wherein the image sensor is a tracking camera for six degrees of freedom pose estimation.

Aspect 21. The method of any of Aspects 17 to 20, wherein the plurality of training images that are horizontally aligned with the reference scene are rotated ninety degrees relative to the image that is vertically aligned with the scene.

Aspect 22. The method of any of Aspects 17 to 21, wherein the plurality of training images that are horizontally aligned with the reference scene are aligned with a horizon of the reference scene and the scene.

Aspect 23. The method of any of Aspects 17 to 22, wherein the neural network is one of a convolutional neural network, a fully connected neural network, or a vision transformer.

Aspect 24. The method of any of Aspects 17 to 23, further comprising outputting, based on processing the image using the neural network, at least one of a semantic segmentation map or an object detection output.

Aspect 25. The method of any of Aspects 17 to 24, wherein the plurality of weights are included in at least one convolutional kernel.

Aspect 26. The method of Aspect 25, wherein the plurality of weights are rotated based on rotating the at least one convolutional kernel.

Aspect 27. The method of Aspect 26, wherein the at least one convolutional kernel is rotated by ninety degrees.

Aspect 28. The method of any of Aspects 17 to 27, wherein the plurality of weights are included in one or more convolutional layers.

Aspect 29. The method of Aspect 28, wherein vertical and horizontal components of at least one of a stride or a padding of the one or more convolutional layers are swapped to generate the rotated weights.

Aspect 30. The method of any of Aspects 17 to 29, wherein the neural network comprises a fully connected layer, and wherein weights of the fully connected layer are not rotated.

Aspect 31. The method of any of Aspects 17 to 30, wherein the device is a head-mounted device (HMD).

Aspect 32. The method of any of Aspects 17 to 31, further comprising receiving, by the device from another device, the neural network with the rotated weights.

Aspect 33. A non-transitory computer-readable medium having stored thereon instructions that, when executed by at least one processor, cause the at least one processor to perform operations according to any of Aspects 17 to 32.

Aspect 34. An apparatus for image processing, the apparatus including one or more means for performing operations according to any of Aspects 17 to 32.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more."

What is claimed is:

1. An apparatus for image processing, the apparatus comprising:
   at least one memory; and
   at least one processor coupled to the at least one memory and configured to:
      obtain an image of a scene, wherein the image is vertically aligned with the scene; and
      process the image using a neural network with rotated weights, the neural network being trained using a plurality of training images to generate a plurality of weights, wherein the plurality of training images are horizontally aligned with a reference scene, and wherein the plurality of weights are rotated to generate the rotated weights.

2. The apparatus of claim 1, further comprising an image sensor configured to capture the image of the scene.

3. The apparatus of claim 2, wherein the image sensor is vertically aligned with a horizontal axis of the apparatus.

4. The apparatus of claim 2, wherein the image sensor is a tracking camera for six degrees of freedom pose estimation.

5. The apparatus of claim 1, wherein the plurality of training images that are horizontally aligned with the reference scene are rotated ninety degrees relative to the image that is vertically aligned with the scene.

6. The apparatus of claim 1, wherein the plurality of training images that are horizontally aligned with the reference scene are aligned with a horizon of the reference scene and the scene.

7. The apparatus of claim 1, wherein the neural network is one of a convolutional neural network, a fully connected neural network, or a vision transformer.

8. The apparatus of claim 1, wherein the at least one processor is configured to output, based on processing the image using the neural network, at least one of a semantic segmentation map or an object detection output.

9. The apparatus of claim 1, wherein the plurality of weights are included in at least one convolutional kernel.

10. The apparatus of claim 9, wherein the plurality of weights are rotated based on rotating the at least one convolutional kernel.

11. The apparatus of claim 10, wherein the at least one convolutional kernel is rotated by ninety degrees.

12. The apparatus of claim 1, wherein the plurality of weights are included in one or more convolutional layers.

13. The apparatus of claim 12, wherein vertical and horizontal components of at least one of a stride or a padding of the one or more convolutional layers are swapped to generate the rotated weights.

14. The apparatus of claim 1, wherein the neural network comprises a fully connected layer, and wherein weights of the fully connected layer are not rotated.

15. The apparatus of claim 1, wherein the apparatus is a head-mounted device (HMD).

16. The apparatus of claim 1, wherein the at least one processor is configured to receive, from a device, the neural network with the rotated weights.

17. A method of image processing at a device, the method comprising:
   obtaining an image of a scene, wherein the image is vertically aligned with the scene; and
   processing the image using a neural network with rotated weights, the neural network being trained using a plurality of training images to generate a plurality of weights, wherein the plurality of training images are horizontally aligned with a reference scene, and wherein the plurality of weights are rotated to generate the rotated weights.

18. The method of claim 17, further comprising capturing, using an image sensor, the image of the scene.

19. The method of claim 18, wherein the image sensor is vertically aligned with a horizontal axis of the device.

20. The method of claim 17, wherein the plurality of weights are included in at least one convolutional kernel, and wherein the plurality of weights are rotated based on rotating the at least one convolutional kernel.

* * * * *